(12) United States Patent
Matsuno et al.

(10) Patent No.: US 7,742,094 B2
(45) Date of Patent: Jun. 22, 2010

(54) SYSTEM AND METHOD FOR CLASSIFYING FILES IN AN INFORMATION PROCESSING DEVICE

(75) Inventors: Katsumi Matsuno, Kanagawa (JP); Osamu Date, Saitama (JP)

(73) Assignee: Sony Corporation (JP)

( * ) Notice: Subject to any disclaimer, the term of this patent is extended or adjusted under 35 U.S.C. 154(b) by 642 days.

(21) Appl. No.: 10/551,733

(22) PCT Filed: Mar. 22, 2004

(86) PCT No.: PCT/JP2004/003871
§ 371 (c)(1),
(2), (4) Date: Oct. 3, 2005

(87) PCT Pub. No.: WO2004/092957
PCT Pub. Date: Oct. 28, 2004

(65) Prior Publication Data
US 2007/0206831 A1 Sep. 6, 2007

(30) Foreign Application Priority Data
Apr. 17, 2003 (JP) .............................. 2003-112601

(51) Int. Cl.
*H04N 5/222* (2006.01)
(52) U.S. Cl. ................................. 348/333.05
(58) Field of Classification Search .................. None
See application file for complete search history.

(56) References Cited

U.S. PATENT DOCUMENTS

| | | | |
|---|---|---|---|
| 6,757,479 B1 * | 6/2004 | Niikawa ....................... 386/68 |
| 6,950,989 B2 * | 9/2005 | Rosenzweig et al. ........ 715/721 |
| 6,996,782 B2 * | 2/2006 | Parker et al. ................ 715/764 |
| 7,325,198 B2 * | 1/2008 | Adcock et al. .............. 715/722 |
| 2002/0140820 A1 * | 10/2002 | Borden, IV ............ 348/207.99 |
| 2003/0033296 A1 * | 2/2003 | Rothmuller et al. ............ 707/3 |
| 2004/0078389 A1 * | 4/2004 | Hamilton .................. 707/104.1 |
| 2004/0145602 A1 * | 7/2004 | Sun et al. .................... 345/720 |

FOREIGN PATENT DOCUMENTS

| | | |
|---|---|---|
| JP | 11-215457 A | 8/1999 |
| JP | 2001-056727 A | 2/2001 |
| JP | 2002-112165 A | 4/2002 |
| JP | 2003-030021 A | 1/2003 |
| JP | 2003-283975 A | 10/2003 |

\* cited by examiner

*Primary Examiner*—Justin P Misleh
(74) *Attorney, Agent, or Firm*—Lerner, David, Littenberg, Krumholz & Mentlik, LLP

(57) ABSTRACT

Information created by a device and recorded on a recording medium and information supplied externally to the device and recorded on the recording medium are classified according to creation date and time information. Each image data file recorded on the recording medium has an original recorded file flag added thereto which indicates whether the image data file is obtained by photographing using the device. Photographing date and time information is added to an image data file obtained by photographing using the device. Obtainment date and time information is added to an image data file supplied externally. In a classification process, an original recorded file flag is checked; an obtainment date and time is used for an image data file obtained externally; a photographing date and time is used for an image data file obtained by photographing; a classification process is performed; and a result of the classification process is displayed.

14 Claims, 17 Drawing Sheets

FIG. 2

STILL IMAGE FILE A
- a — ORIGINAL RECORDED FILE FLAG
- b — PHOTOGRAPHING DATE AND TIME
- c — CORRECTION DATE AND TIME
- d — THUMBNAIL DATA
  ⋮

STILL IMAGE FILE B
- a — ORIGINAL RECORDED FILE FLAG
- b — PHOTOGRAPHING DATE AND TIME
- c — CORRECTION DATE AND TIME
- d — THUMBNAIL DATA
  ⋮

MOVING IMAGE FILE C
- a — ORIGINAL RECORDED FILE FLAG
- b — PHOTOGRAPHING DATE AND TIME
- c — CORRECTION DATE AND TIME
- d — THUMBNAIL DATA
  ⋮

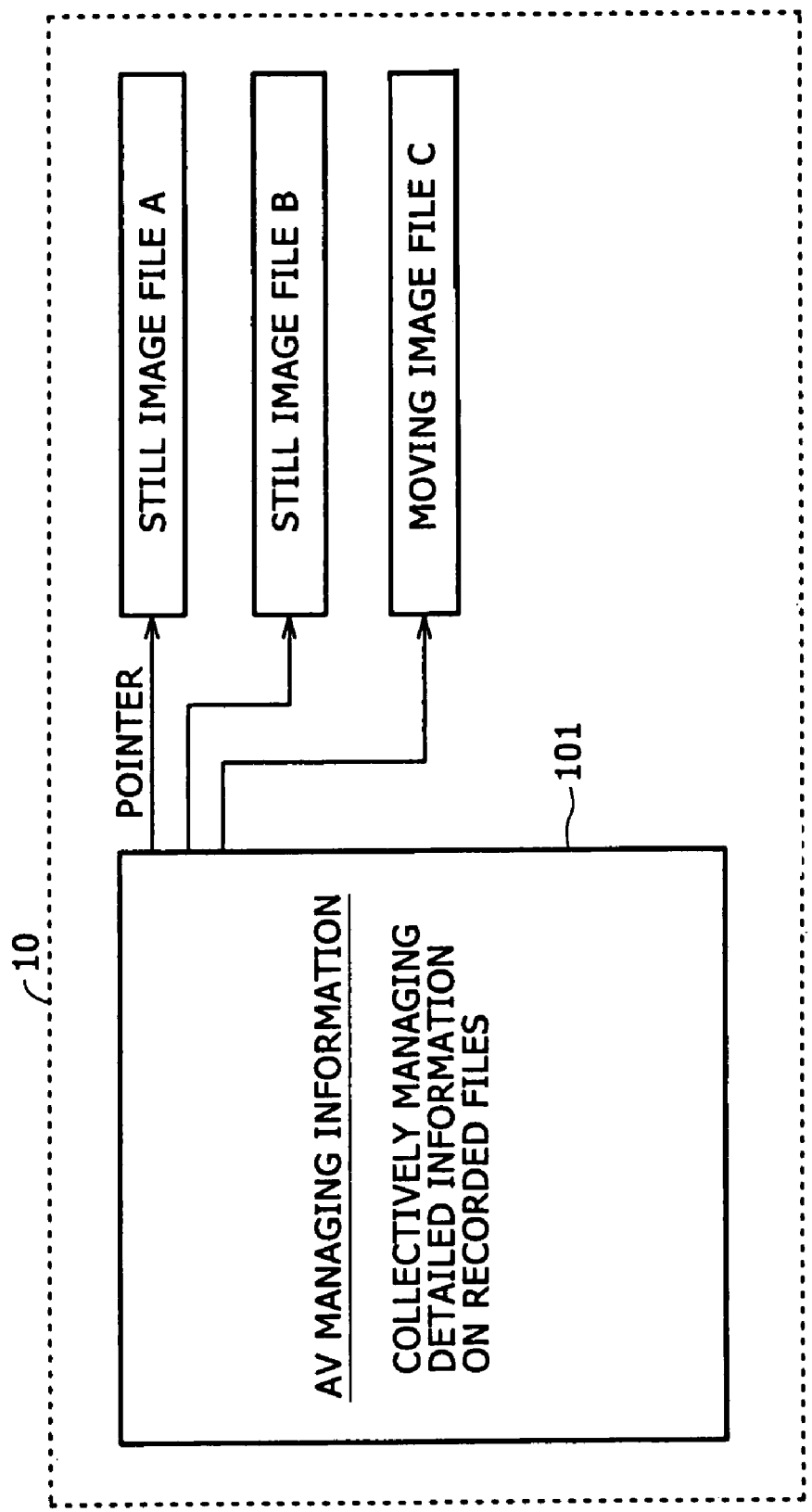

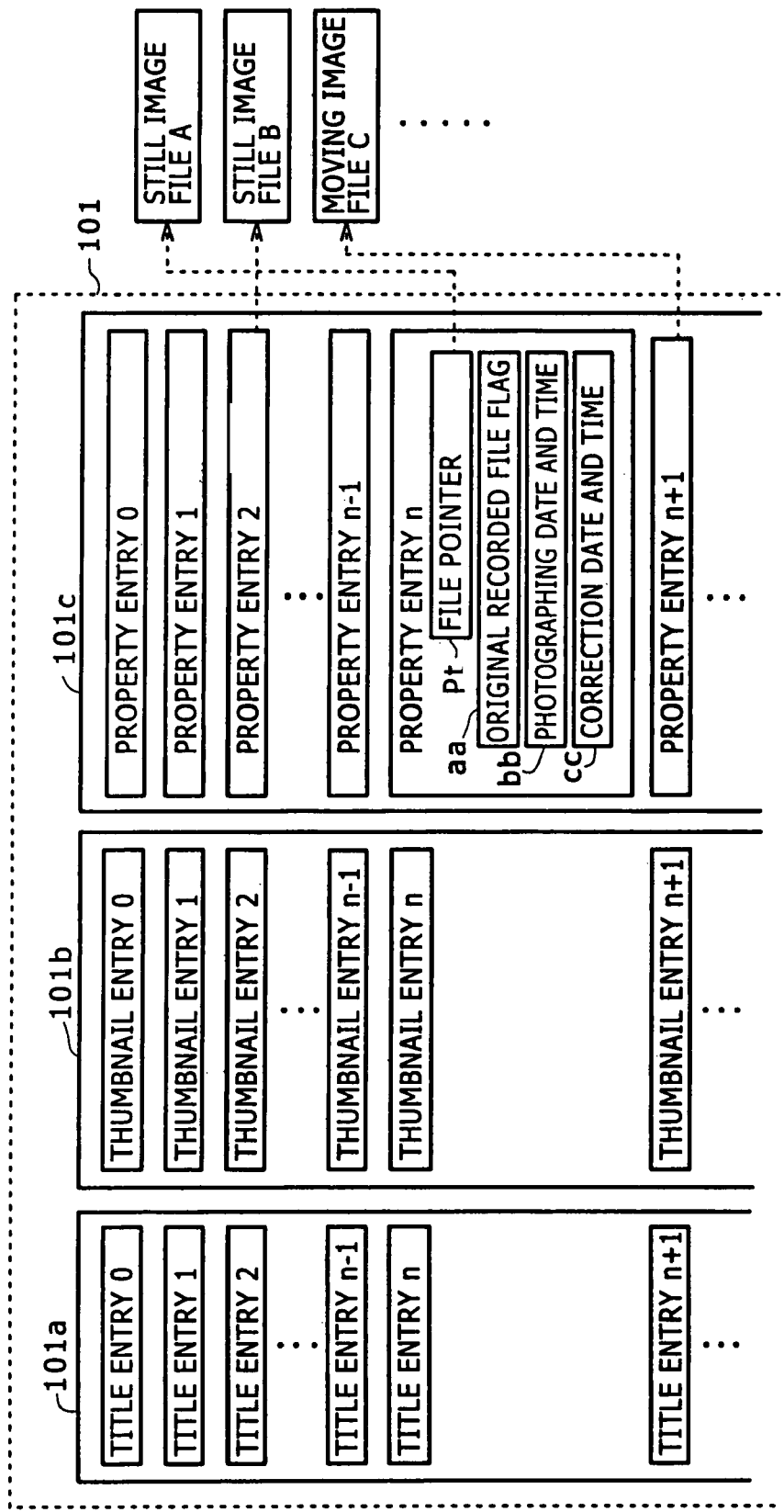

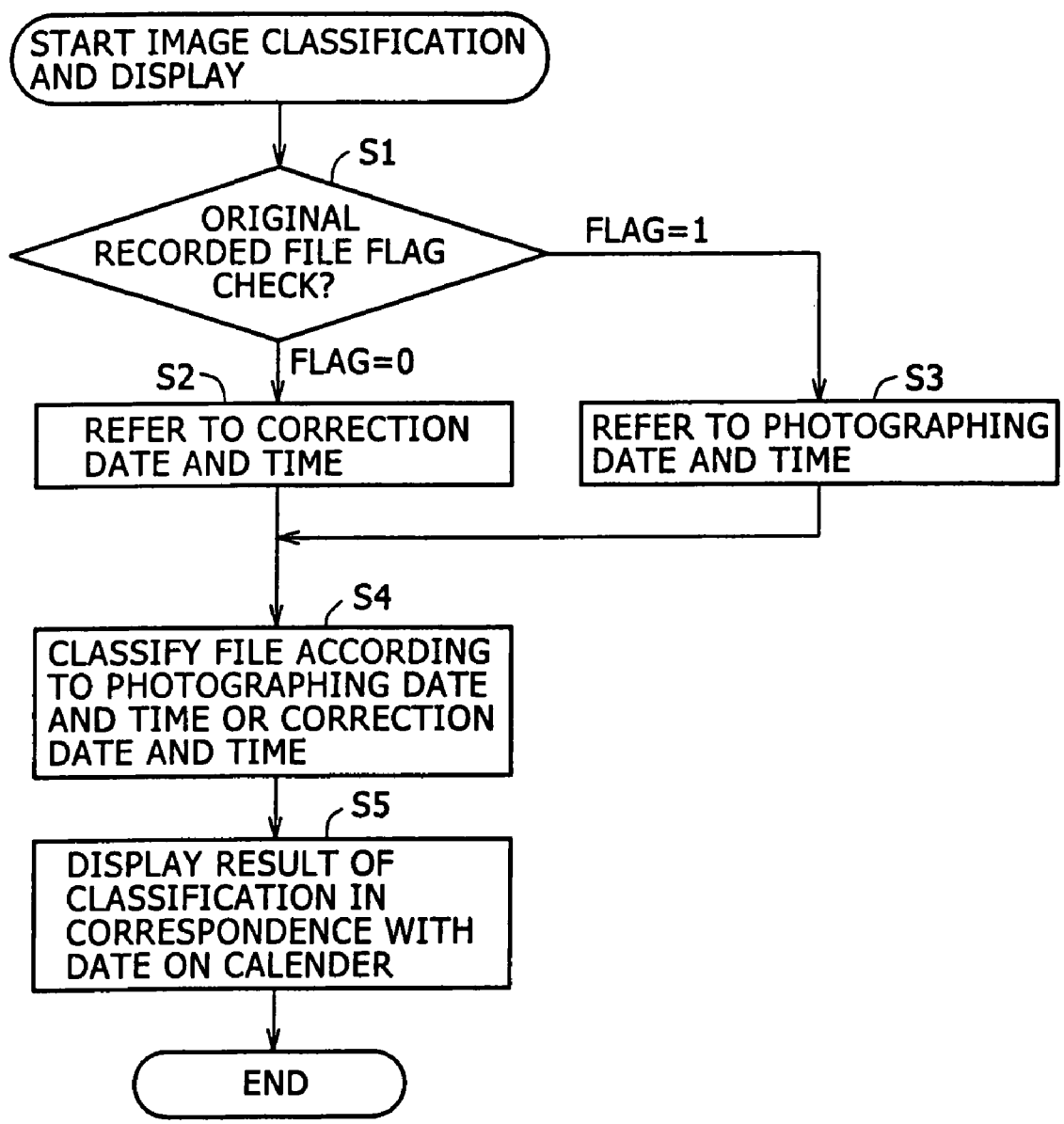

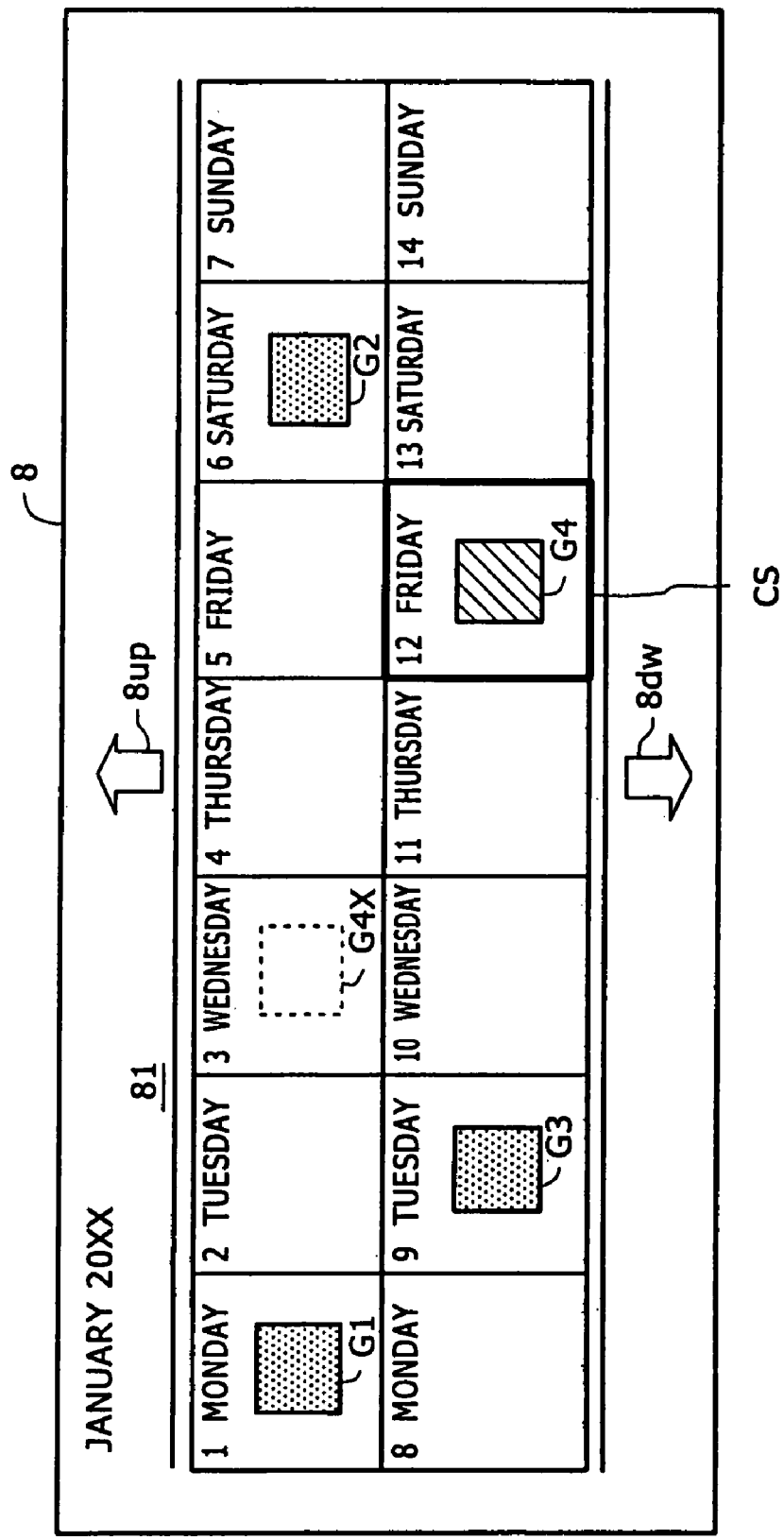

FIG. 8

| | | | | | | |
|---|---|---|---|---|---|---|
| 1 MONDAY | 2 TUESDAY | 3 WEDNESDAY | 4 THURSDAY | 5 FRIDAY | 6 SATURDAY | 7 SUNDAY |
| 8 MONDAY | 9 TUESDAY | 10 WEDNESDAY | 11 THURSDAY | 12 FRIDAY | 13 SATURDAY | 14 SUNDAY |
| 15 MONDAY | 16 TUESDAY | 17 WEDNESDAY | 18 THURSDAY | 19 FRIDAY | 20 SATURDAY | 21 SUNDAY |
| 22 MONDAY | 23 TUESDAY | 24 WEDNESDAY | 25 THURSDAY | 26 FRIDAY | 27 SATURDAY | 28 SUNDAY |
| 29 MONDAY | 30 TUESDAY | 31 WEDNESDAY | 1 THURSDAY | 2 FRIDAY | 3 SATURDAY | 4 SUNDAY |

SKIPPED AREA

R1, R2, R3

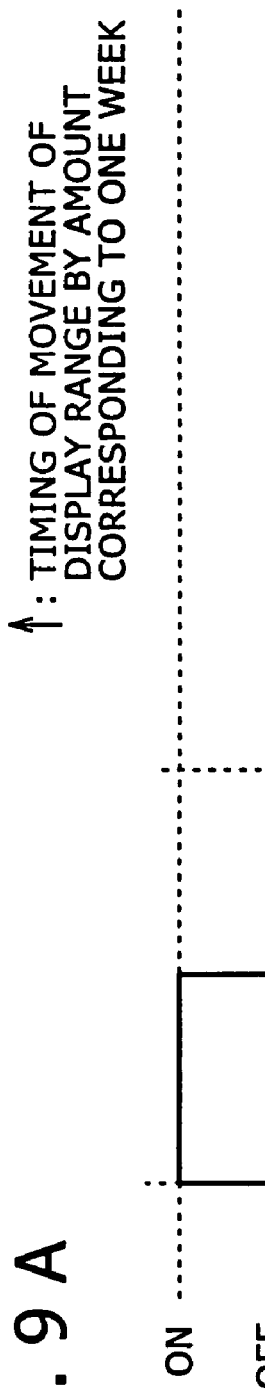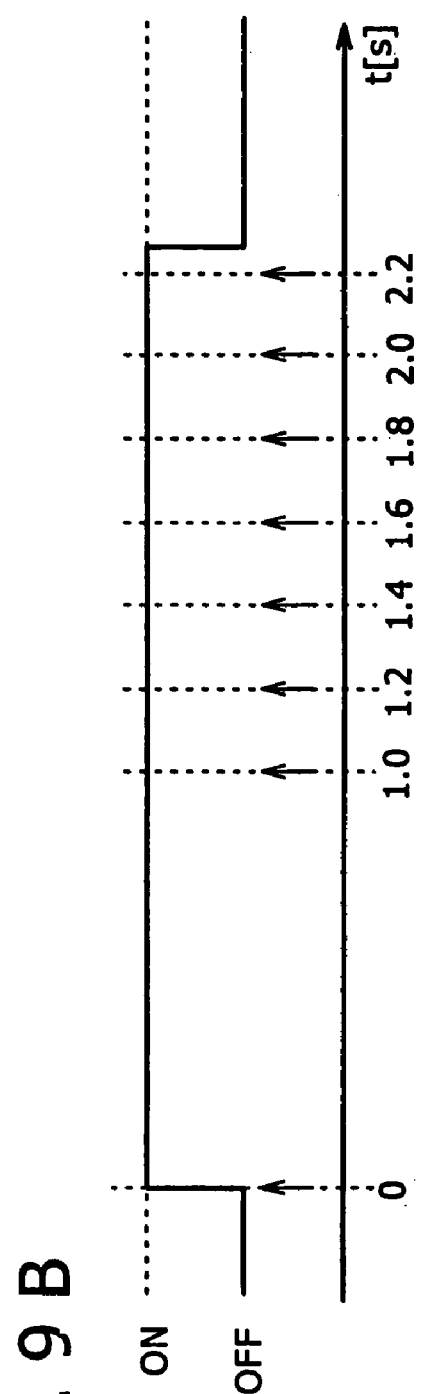
FIG. 9A
FIG. 9B

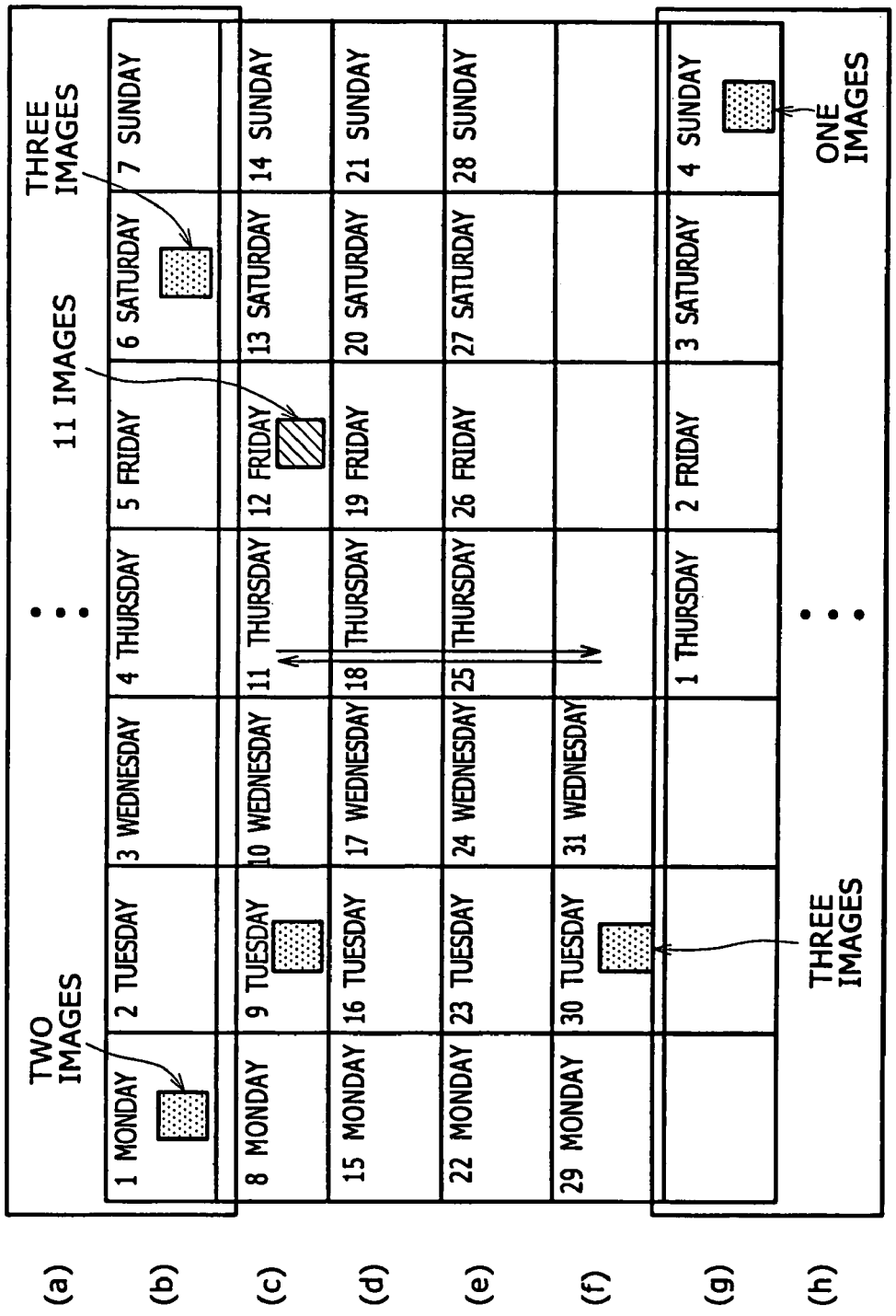

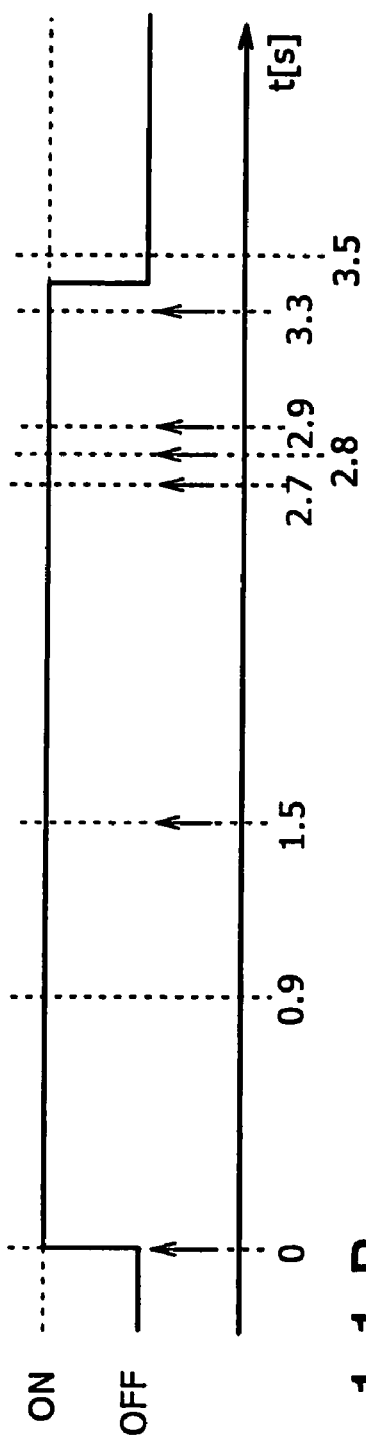
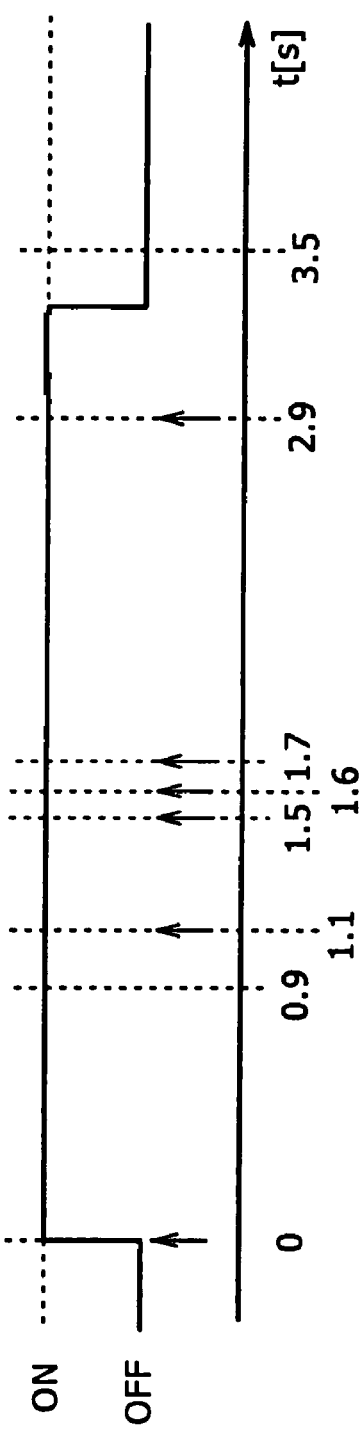
FIG.11A
FIG.11B

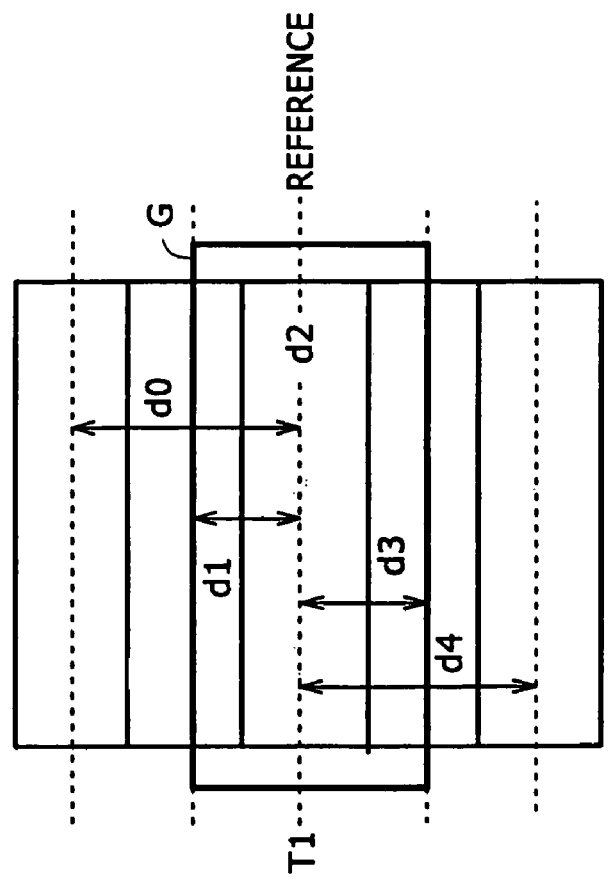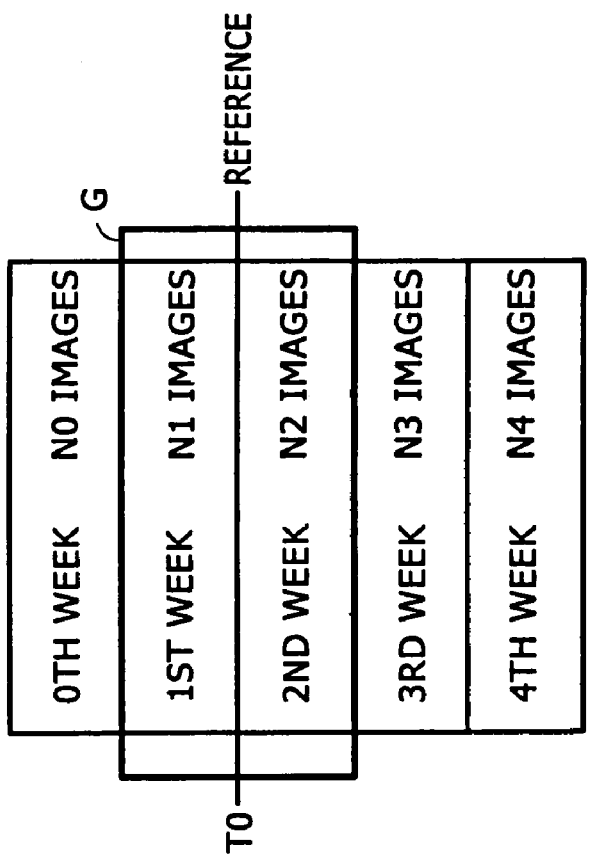

$$X = \sum_{i=0}^{4} wi \times Ni \quad \cdots \cdot (\text{EQUATION 3})$$

$$V = 1 / F(X) \quad \cdots \cdot (\text{EQUATION 4})$$

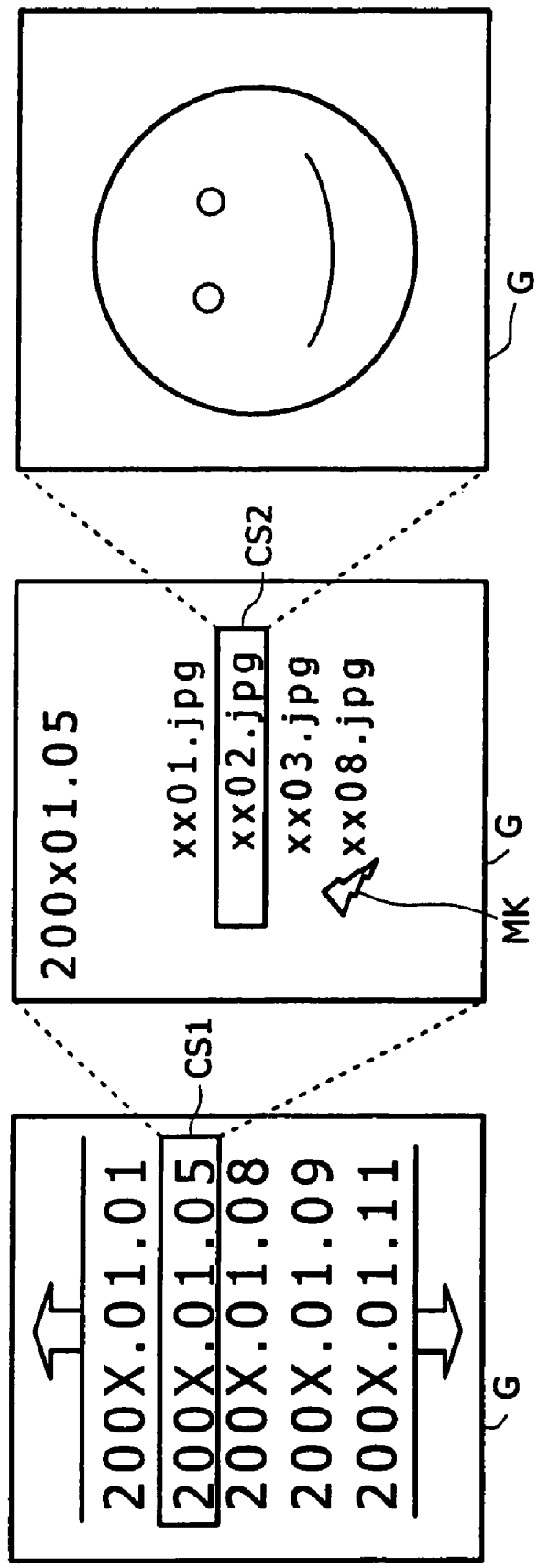

SYSTEM AND METHOD FOR CLASSIFYING FILES IN AN INFORMATION PROCESSING DEVICE

BACKGROUND OF THE INVENTION

The present invention relates to an information processing device that has a camera function and an information input function of a key operating unit or the like, and that can receive external information by wire or radio, such as, for example, a digital camera, a PDA (Personal Digital Assistant), or a portable communication terminal, and a method for classification processing on captured information.

An image taken by an image pickup device such as a digital camera or the like is recorded on a recording medium. The image recorded on the recording medium can be reproduced and used through a display device such as an LCD (Liquid Crystal Display) or the like provided to the image pickup device. Further, the image recorded on the recording medium is displayed on the display device using a representative image such as a thumbnail or the like, whereby a plurality of images recorded on the recording medium can be checked at a time.

However, with an increase in the capacity of the recording medium, a much larger number of images than before can be recorded when images taken by the image pickup device are to be recorded on the recording medium. Therefore, when a desired image is to be selected from the taken images and displayed, it is difficult for a user to extract the desired image from among the large number of images recorded on the recording medium.

Patent Document 1 (Japanese Patent Laid-open No. Hei 11-215457) proposes a method of managing images recorded on a recording medium by classifying the taken images according to photographing dates and times thereof. In the case of this technique, the images are classified according to the photographing dates and times thereof, and therefore if a date of photographing of a desired image can be roughly guessed, the desired image can be retrieved quickly. The technique is beneficial when a photographing date and time of an image recorded on the recording medium is desired to be known later, for example.

With the development of networks, an image pickup device can be connected to another image pickup device, a personal computer (hereinafter abbreviated to a PC), and various servers. It is thereby possible for a user to capture images taken by a friend in the image pickup device of the user and use the images, for example.

Further, images made open to the public through servers on a network can be downloaded and reproduced similarly. In this case, images taken independently and the images supplied through the network and the like are mixed with each other on the recording medium of the image pickup device.

In the case where the images taken by the own device and the images obtained through the network are thus mixed with each other on the recording medium, when these images are managed by the method described in the above-mentioned Patent Document 1, the images obtained through the network are classified according to photographing dates and times thereof, of course.

However, it is not often that the user of the image pickup device knows the photographing dates and times of images obtained through an external device or a network, and there is no need for the user of the image pickup device to know the photographing dates and times of images obtained through an external device or a network. Thus, images obtained through an external device or a network are classified into unexpected dates, and therefore it is difficult to extract a desired image.

In addition, when a result of classification covers a wide range, for example when images are classified according to photographing dates and times thereof and the photographing dates and times of the taken images cover a wide range such as a period of a few months, a period of a few years or the like, it takes much time to check the result of classification.

Such a problem occurs inevitably not only when image data is managed in a digital camera but also when information obtained through different paths, such as, for example, information generated by an own device and information obtained through a network, needs to be managed.

For example, in a case where a PDA manages text data input through the keyboard of the own device and text data obtained through a network, or in a case where a portable telephone terminal manages data of an incoming call melody (a so-called ringer tone) created by inputting information through the key operating unit of the own device and data of a ringer tone obtained through a network, it is difficult to make a search when the data obtained through the network is to be managed by a date of creation of the data.

In view of the above, it is an object of the present invention to provide an information processing device and an information processing method that do not impair advantages of classification of information according to the creation dates and times of the information when desired information is extracted from information recorded on a recording medium, can perform classification even of information obtained via a network or the like appropriately, and enables a result of classification to be checked quickly even when the result of classification covers a wide range.

SUMMARY OF THE INVENTION

In order to solve the above problems, an information processing device according to an embodiment of the invention includes classifying means for classifying files recorded on a recording medium according to information on a date of creation of each one of the classified files; detecting means for detecting an externally obtained file from among the classified files recorded on the recording medium; and display control means for displaying a result of classification by the classifying means on a display unit; wherein, when the detecting means detects the externally obtained file, the classifying means classifies the externally obtained file according to information on a date of obtainment of the externally obtained file.

In the information processing device according to the invention, when the files recorded on the recording medium are classified by the classifying means, externally supplied files detected by the detecting means are classified according to information on dates of obtainment of the files, and files not externally supplied are classified according to information on dates of creation of the files. A result of classification by the classifying means is displayed on the display unit under control of the display control means and provided to a user.

Thus, both files supplied externally and files not externally supplied (created (generated) in the own device) are classified according to dates of processing (dates of obtainment or dates of creation) of the files in the device.

Therefore, since each file on the recording medium is not classified using information on dates and times that the user does not know, it is possible to perform a classification process for facilitating retrieval of desired file information and notify the user of the results of the classification process.

BRIEF DESCRIPTION OF THE DRAWINGS

FIG. 2 is a diagram of assistance in explaining a system of managing image data and managing information therefor integrally;

FIG. 3 is a diagram of assistance in explaining a system of collectively managing information for image data separately from image data files;

FIG. 4 is a diagram of assistance in explaining an example of AV managing information shown in FIG. 3;

FIG. 5 is a flowchart of assistance in explaining a flow of a series of processes in classifying image data recorded as files on a recording medium according to photographing date and time information;

FIG. 6 is a diagram of assistance in explaining an example of a classification result providing image for displaying a result of classification on date image information (calendar information);

FIG. 8 is a diagram of assistance in explaining a result of classification of image data and a display skipping process;

FIG. 9A and FIG. 9B are diagrams of assistance in explaining an ordinary image scrolling process;

FIG. 10 is a diagram showing an example of a result of classification of image data and a scroll speed control process;

FIG. 11A and FIG. 11B are diagrams of assistance in explaining an example of the scroll speed control process;

FIG. 15A and FIG. 15B are diagrams of assistance in explaining scroll speed control with weighting taken into consideration;

FIGS. 18A, 18B, and 18C are diagrams of assistance in explaining a display mode of a result of classification displayed on the display screen G of a display element.

DETAILED DESCRIPTION

One embodiment of a device and a method according to the present invention will hereinafter be described with reference to the drawings. The embodiment will be described below by taking as an example a case where the device and the method according to the present invention are applied to an image pickup device, or a digital camera capable of taking still images and moving images.

Configuration and Basic Operation of Image Pickup Device

Figure 1:
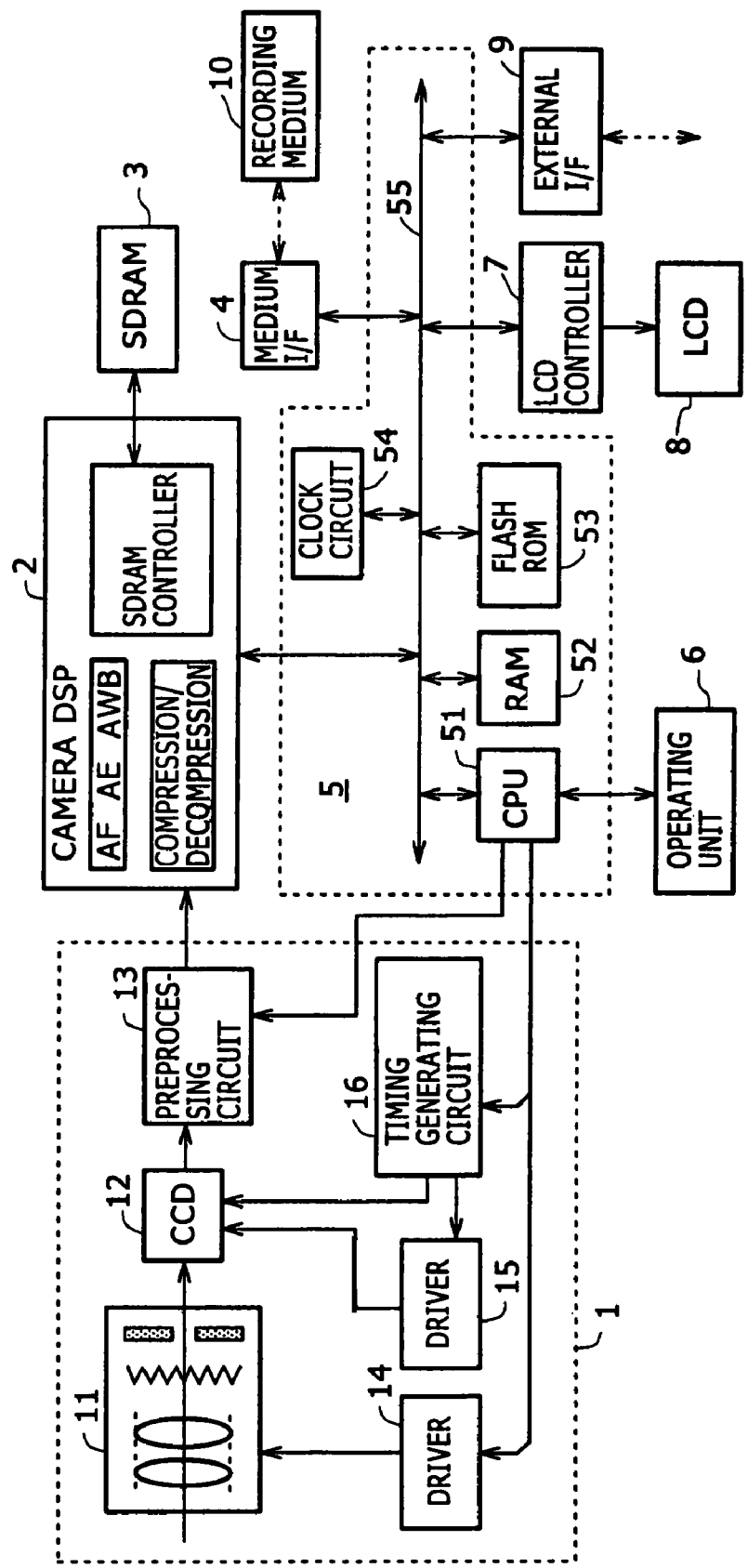
FIG. 1 is a block diagram of assistance in explaining a digital camera to which one embodiment of an information processing device according to the present invention is applied.

FIG. 1 is a block diagram of assistance in explaining an image pickup device according to the present embodiment.

As shown in FIG. 1, when divided broadly, the image pickup device according to the present embodiment includes a camera unit 1, a camera DSP (Digital Signal Processor) 2, an SDRAM (Synchronous Dynamic Random Access Memory) 3, a medium interface (hereinafter referred to as a medium I/F) 4, a control unit 5, an operating unit 6, an LCD (Liquid Crystal Display) controller 7, an LCD 8, an external interface (hereinafter referred to as an external I/F) 9, and a detachable recording medium 10.

As the recording medium 10, various media including, for example, so-called memory cards using a semiconductor memory, optical recording media such as recordable DVDs (Digital Versatile Disks), recordable CDs (Compact Discs) and the like, and magnetic disks may be used. The description in the present embodiment will be made supposing that a memory card, for example, is used as the recording medium 10.

As shown in FIG. 1, the camera unit 1 includes an optical block 11, a CCD (Charge Coupled Device) 12, a preprocessing circuit 13, a driver 14 for the optical block, a driver 15 for the CCD, and a timing generating circuit 16. The optical block 11 includes lenses, a focus mechanism, a shutter mechanism, a diaphragm (iris) mechanism, and the like.

The control unit 5 is a microcomputer formed by connecting a CPU (Central Processing Unit) 51, a RAM (Random Access Memory) 52, a flash ROM (Read Only Memory) 53, and a clock circuit 54 with each other via a system bus 55. The control unit 5 can control various parts of the image pickup device according to the present embodiment.

The RAM 52 is used mainly as a work area for temporarily storing a result of a process in progress, for example. The flash ROM 53 stores various programs executed by the CPU 51, data required for processes, and the like. The clock circuit 54 can provide a present year, month and day, a present day of the week, and a present time, and also has a calendar function. The clock circuit 54 can provide a photographing date and time and the like.

At the time of taking an image, according to control from the control unit 5, the optical block driver 14 forms a driving signal for operating the optical block 11, then supplies the driving signal to the optical block 11, and thereby operates the optical block 11. The focus mechanism, the shutter mechanism, and the diaphragm mechanism of the optical block 11 are controlled according to the driving signal from the driver 14 so that the optical block 11 captures an image of a subject and provides the image to the CCD 12.

The CCD 12 subjects the image from the optical block 11 to photoelectric conversion, and then outputs the result. The CCD 12 operates according to a driving signal from the CCD driver 15. The CCD 12 captures the image of the subject from the optical block 11, and supplies the captured image (image information) of the subject as an electric signal to the preprocessing circuit 13 according to a timing signal from the timing generating circuit 16 controlled by the control unit 5.

As described above, the timing generating circuit 16 forms the timing signal for providing predetermined timing according to control from the control unit 5. The CCD driver 15 forms a driving signal to be supplied to the CCD 12 on the basis of the timing signal from the timing generating circuit 16.

The preprocessing circuit 13 subjects the image information of the electric signal supplied to the preprocessing circuit 13 to a CDS (Correlated Double Sampling) process for maintaining a good S/N ratio, and to an AGC (Automatic Gain Control) process for controlling gain. Then, the preprocessing circuit 13 subjects the image information to A/D (Analog/Digital) conversion, and thereby forms image data as a digital signal.

The image data as a digital signal from the preprocessing circuit 13 is supplied to the DSP 2. The DSP 2 subjects the image data supplied to the DSP 2 to camera signal processes such as AF (Auto Focus), AE (Auto Exposure), AWB (Auto White Balance) and the like. The image data after being thus subjected to the various adjustments is compressed by a predetermined compression system, supplied to the recording medium 10 loaded in the image pickup device according to the present embodiment through the system bus 55 and the medium I/F 4, and then recorded as a file on the recording medium 10, as will be described later.

Of the image data recorded on the recording medium 10, desired image data is read from the recording medium 10 through the medium I/F 4 according to an operating input from a user, which input is received through the operating unit 6 including a touch panel, a control key and the like, and then supplied to the DSP 2.

The DSP 2 subjects the compressed image data read from the recording medium 10 and supplied to the DSP 2 through the medium I/F 4 to a decompression process (expanding process), and then supplies the image data after the decompression to the LCD controller 7 through the system bus 55. The LCD controller 7 forms an image signal to be supplied to the LCD 8 from the image data supplied to the LCD controller 7, and then supplies the image signal to the LCD 8. An image corresponding to the image data recorded on the recording medium 10 is thereby displayed on the display screen of the LCD 8.

Incidentally, the display form of the image is in accordance with a display process program recorded on the ROM. That is, this display process program is about what arrangement is used to record a file system to be described later and how the image is reproduced.

The image pickup device according to the present embodiment is also provided with the external I/F 9. The image pickup device according to the present embodiment is connected to an external personal computer, for example, via the external I/F 9 so that the image pickup device can be supplied with image data from the personal computer and record the image data on the recording medium loaded in the own device, and supply image data recorded on the recording medium loaded in the own device to the external personal computer or the like.

By connecting a communication module to the external I/F 9, the image pickup device is connected to a network, such as, for example, the Internet, so that the image pickup device can obtain various image data and other information through the network and record the various image data and other information on the recording medium loaded in the own device, or transmit data recorded on the recording medium loaded in the own device to a target destination through the network.

In addition, information such as image data and the like obtained through an external personal computer or a network and recorded on the recording medium can of course be read and reproduced by the image pickup device according to the present embodiment to be displayed on the LCD 8 for use by the user as described above.

Incidentally, the external I/F 9 can be provided as a wired interface of IEEE (Institute of Electrical and Electronics Engineers) 1394, USB (Universal Serial Bus) or the like, or can be provided as a wireless interface using light or radio waves. That is, the external I/F 9 may be either a wired interface or a wireless interface.

Thus, the image pickup device according to the present embodiment can photograph an image of a subject and record the image on the recording medium loaded in the image pickup device, and read, reproduce, and use image data recorded on the recording medium. The image pickup device can also be supplied with image data through an external personal computer or a network and record the image data on the recording medium loaded in the own device, and read and reproduce the image data.

Also, the image pickup device according to the present embodiment can collectively manage both image data obtained by photographing by the image pickup device and recorded on the recording medium and image data supplied externally and recorded on the recording medium, perform a classification process to enable the image data of a desired image to be retrieved easily and quickly, and provide a result of the classification to the user.

That is, in the image pickup device according to the present embodiment, the image data of images photographed by the image pickup device and recorded on the recording medium and the image data of images supplied externally and recorded on the recording medium are recorded on the recording medium in such a manner as to be clearly distinguishable from each other.

Both the image data of the images photographed by the image pickup device and recorded on the recording medium and the image data of the images supplied externally and recorded on the recording medium are classified so that the image data of the images photographed by the image pickup device and recorded on the recording medium and the image data of the images supplied externally and recorded on the recording medium can be managed collectively in a mixed state. Key information used for the classification is different between the image data of the images photographed by the image pickup device and the image data of the images supplied externally.

Specifically, the classification is performed such that for image data captured by photographing by the image pickup device and recorded as a file on the recording medium, information on a date of creation of the file is used as classification key information and for image data captured after being supplied externally and recorded as a file on the recording medium, information on an obtainment date on which the image pickup device obtained the image data is used as classification key information.

Information on a date of creation of a file is information on a date on which the file was created, and, in the present embodiment, is equivalent to information on a date of photographing of an image recorded as image data in the file. Information on a date of creation of a file, that is, information on a photographing date, is a concept including various information on the photographing date including the year, month, and day of photographing, a photographing time, a photographing day of the week and the like; in the present embodiment, a photographing date and time (the year, month, and day of photographing and a photographing time) is used as information on a date of creation of a file.

In the present embodiment, information on a date of obtainment of image data is information on a date of obtainment by the image pickup device of the image data provided through an external device or a network without a photographing process being involved, and recorded as a file on the recording medium, and is a concept including various information on the obtainment date including the year, month, and day of the obtainment, an obtainment time, an obtainment day of the week and the like; in the present embodiment, an obtainment date and time (the year, month, and day of obtainment and an obtainment time) is used as information on a date of obtainment of image data.

Thus, image data provided externally and recorded on the recording medium, rather than image data recorded on the recording medium after photographing by the image pickup device according to the present embodiment, can be managed by information on an actual image pickup date of the image data as well as information on a date of obtainment of the image data by the image pickup device according to the present embodiment.

Information on a date of obtainment by the image pickup device of image data supplied through an external device or a network rather than information on a photographing date of the image data is thus used as a classification key for the following reason.

It is not often that the user of the image pickup device according to the present embodiment knows the date of actual taking of an image of image data supplied externally. When a classification process is performed using the actual taking date of the image data supplied externally as a classification key, the image data is classified into a date and time that the user does not know at all. Therefore, a date and time of obtainment by the image pickup device of image data supplied externally rather than a date and time of actual photographing of an image of the image data supplied externally is used as a classification key.

Thus, a classification process is performed using a date and time of photographing by the image pickup device for image data obtained by photographing by the image pickup device, and using a date and time of obtainment by the image pickup device for image data supplied externally. The dates and times in both cases represent dates and times when the image data was first captured and recorded on the recording medium, and are thus information that the user himself/herself of the image pickup device recognizes and knows.

Thus, using the dates and times when the image pickup device first captured the image data as classification key information prevents the inconvenience of, for example, taking time to find the image data of a desired image because the image data supplied externally is classified into unintended days.

System for Managing Image Data Managing Information

The management of managing information for each piece of image data recorded on the recording medium, such as information indicating whether or not the image data is obtained by photographing by the own device, information indicating a photographing date and time or an obtainment date and time, and the like, is roughly divided into the following two managing systems, though depending on a file system used in the image pickup device.

One managing system adds, to each piece of image data recorded as a file on the recording medium, managing information on the image data, and manages the image data and the managing information integrally in the file (image data file) of the image data. The other system collectively manages managing information for a plurality of pieces of image data recorded as a plurality of files on the recording medium separately from the files (image data files) of the image data.

In the following, prior to a concrete description of a classification process and a process for displaying a result of classification, which processes are performed in the image pickup device according to the present embodiment, a description will be made of each of the two managing systems of managing information for image data recorded on the recording medium.

System of Managing Image Data and Managing Information Integrally

A description will first be made of the system that adds, to each piece of image data recorded as a file on the recording medium, managing information on the image data, and manages the image data and the managing information integrally in the image data file. FIG. 2 is a diagram of assistance in explaining the system of managing image data and the managing information of the image data integrally.

Suppose in this case that, as shown in FIG. 2, a still image file A, a still image file B, and a moving image file C are recorded as image data files on the recording medium 10. In each of the still image file A and the still image file B, at least an original recorded file flag a, photographing date and time information b, correction date and time information c, and thumbnail data d are defined in addition to still image data. Similarly, in the moving image file C, an original recorded file flag a, photographing date and time information b, correction date and time information c, and thumbnail data d are defined in addition to moving image data.

The original recorded file flag indicates whether or not the image data file was recorded on the recording medium after photographing by the image pickup device. In the present embodiment, suppose that when the original recorded file flag a is "1", the original recorded file flag a indicates that the image data file is a file of image data obtained by photographing by the image pickup device and that when the original recorded file flag a is "0", the original recorded file flag a indicates that the image data file is a file of image data not obtained by photographing by the image pickup device, that is, supplied externally.

The photographing date and time information indicates a photographing date and time of image data captured by photographing by the image pickup device and recorded on the recording medium. The correction date and time information indicates a date and time when the image data was corrected. As will be described later, however, in the present embodiment, in the case of image data supplied externally, the correction date and time information c is used to indicate an obtainment date and time when the image pickup device obtained the image data.

The thumbnail data d is image data for forming a reduced image of an image formed on the basis of main image data, so to speak, such as image data obtained by photographing or image data obtained externally through an external device or a network. It is possible to have not only one type of reduced image but also a plurality of reduced images.

As described above, the original recorded file flag a, photographing date and time information b, correction date and time information c, thumbnail data d and the like are defined within each file. Hence, when image data is to be classified by photographing date and time for retrieval of desired image data from the image data recorded on the recording medium, for example, a classification process is generally performed on the basis of photographing date and time information of managing information in each image data file.

Incidentally, as for which part of the file has necessary information such as photographing date and time information or the like recorded therein, target information such as photographing date and time information or the like is referred to according to a program recorded on the flash ROM 53, for example, in the image pickup device, as described above, and the classification process is performed.

System of Collectively Managing Managing Information

A description will next be made of the system that collectively manages managing information for each of a plurality of pieces of image data recorded as a plurality of files on the recording medium separately from the image data files, as the other managing system of managing managing information for image data. FIG. 3 is a diagram of assistance in explaining an outline of this collective management system.

As shown in FIG. 3, suppose also in this example that AV (Audio/Visual) managing information 101, a still image file A, a still image file B, and a moving image file C, are recorded on the recording medium 10. In this collective management system, as shown by the AV managing information 101 in FIG. 3, managing information for each piece of image data is managed in a file separate from the image data files A, B, and C. The AV managing information and the image data files are connected to each other by predetermined pointers.

FIG. 4 is a diagram of assistance in explaining an example of the AV managing information. The AV managing information in this example includes a title file 101a, a thumbnail file 101b, and a property file 101c. These files retain various information for image data recorded as files as entry information (registered information).

Title entries 0, 1, 2, . . . registered in the title file 101a retain text data input by the user, for example, such as comments, memorandums, notes or the like about respective pieces of image data stored as files.

Each of thumbnail entries 0, 1, 2, . . . registered in the thumbnail file 101b has reduced image data of an image formed by image data stored as a file, and can have not only one type of reduced image but also a plurality of reduced images.

Property entries 0, 1, 2, . . . registered in the property file 101c retain various managing information for respective pieces of image data stored as files. Each of the property entries includes at least a file pointer Pt, an original recorded file flag aa, photographing date and time information bb, and correction date and time information cc, as shown in the part of the property entry n in FIG. 4.

The file pointer Pt is information for identifying the image data file corresponding to the property entry. As with the original recorded file flag a shown in FIG. 2, the original recorded file flag aa indicates whether or not the image data file was recorded on the recording medium after photographing by the image pickup device. Also in this example, when the original recorded file flag aa is "1", the original recorded file flag aa indicates that the image data file is a file of image data obtained by photographing by the image pickup device and when the original recorded file flag aa is "0", the original recorded file flag aa indicates that the image data file is a file of image data not obtained by photographing by the image pickup device.

As with the photographing date and time information b shown in FIG. 2, the photographing date and time information bb indicates a photographing date and time of image data captured by photographing by the image pickup device and recorded on the recording medium. As with the correction date and time information c shown in FIG. 2, the correction date and time information cc indicates a date and time when the image data was corrected. As will be described later, however, in the case of image data supplied externally, the correction date and time information cc is used to indicate an obtainment date and time when the image pickup device obtained the image data.

A title entry, a thumbnail entry, and a property entry can be provided as AV managing information for one image data file. Each image data file is indirectly associated with a title entry and a thumbnail entry via a property entry.

Thus, in the example shown in FIG. 4, the title entry n, the thumbnail entry n, and the property entry n are provided as AV managing information for the still image file A. The title entry 2, the thumbnail entry 2, and the property entry 2 are provided for the still image file B. Similarly, the title entry n+1, the thumbnail entry n+1, and the property entry n+1 are provided for the moving image file C.

When the system of collectively managing managing information for image data is used, and the image data is to be classified by photographing date and time for retrieval of desired image data from the image data recorded on the recording medium, for example, a classification process can be performed referring to information in each property entry in the property file as one piece of AV managing information without directly accessing each image data file.

Specifically, when searching image information recorded on the recording medium by photographing date and time, the CPU refers to the information in the property file, and searches the photographing dates and times of images to perform classification. Thereafter, images formed by image data in image data files indicated by property entries including photographing date and time information in the property file, or reduced images formed by thumbnail data in thumbnail entries are displayed on the LCD 8 according to a result of the classification.

Thus, providing managing information for image data recorded on the recording medium separately from image data files greatly reduces the time of retrieval or search of image data files. This is easily understood supposing that an optical disk medium such as a DVD or the like is used as the recording medium.

In the case where each image data file described with reference to FIG. 2 has managing information for image data, when searching photographing dates and times of images, a photographing date and time in each image data file needs to be searched. Therefore, when the recording medium is an optical disk such as a DVD, for example, and a plurality of image data files are scattered on the DVD, accessing a desired image data file requires a so-called seek operation for positioning an optical pickup to the recorded position of the desired file on the DVD.

Since this seek operation involves actual movement of the optical pickup and thus takes a certain time, an actual classification process takes a time including the seek time. Although this may not be so noticeable in the case of an optical disk such as a DVD or the like, or in a case where a semiconductor memory is used as the recording medium, this can lead to a loss in an access process when a plurality of image files are recorded such that the address positions of the image files are nonconsecutive.

However, as shown in FIG. 3 and FIG. 4, when the AV managing information is managed by the files separate from the image data files, managing information such as photographing date and time information and the like is managed collectively. Therefore, the time required for search is shortened as compared with the example of the system of managing image data and managing information integrally, which system has been described with reference to FIG. 2.

Thus, regarding managing information for image data recorded on the recording medium, image data and managing information therefor can be managed integrally in an image data file, as shown in FIG. 2, or only managing information can be collectively managed separately from image data files, as shown in FIG. 3 and FIG. 4.

Obtainment and Management of External Image Data

As described above, the image pickup device according to the present embodiment shown in FIG. 1 can be connected to an external device via the external I/F 9, supplied with image information obtained by photographing by another device and image data of images open to the public on the Web, and can record the image information and the image data on the recording medium 10 loaded in the own device.

The image data of images photographed by the own device and the image data of images obtained from other devices can be mixed on the recording medium loaded in the image pickup device according to the present embodiment. In this case, when the image data recorded on the recording medium is classified by photographing date and time, since it is generally difficult for the user to know the photographing dates and times of the images obtained from the other devices, as described above, and there is not a great necessity for the user to know the photographing dates and times of the images obtained from the other devices, the images formed by the image data obtained from the other devices can be classified into unexpected dates and times, causing confusion in retrieval of a desired image.

In order to solve this problem, the image pickup device according to the present embodiment uses correction date and time information and an original recorded file flag as one piece of managing information for images recorded on the recording medium described with reference to FIG. 2 and FIG. 4.

Specifically, when image data supplied via an external device or a network through the external I/F 9 is captured and recorded on the recording medium, the control unit 5 sets the original recorded file flag a or aa of the externally supplied image data to "0". Of course, the control unit 5 sets the original recorded file flag a or aa of image data captured by photographing by the own device to "1". It is thereby possible to clearly distinguish between image data captured by photographing by the own device and recorded as a file on the recording medium and image data externally supplied through the external I/F 9 and recorded as a file on the recording medium.

Further, when image data supplied via an external device or a network through the external I/F 9 is captured and recorded on the recording medium, the control unit 5 records a date and time of obtainment of the image data by the image pickup device as the correction date and time information c or cc of the externally supplied image data.

Specifically, when photographing is performed through the camera unit 1 in the image pickup device according to the present embodiment, the image pickup device is changed to a camera mode through the operating unit 6. When image data supplied through the external I/F is recorded on the recording medium, the image pickup device is set in an external recording mode, for example, rather than the camera mode, and an external device or the like is connected to the external I/F 9.

Therefore, when photographing is performed and image data captured is recorded in the camera mode, the control unit 5 of the image pickup device sets "1" to the original recorded file flag of the image data, and sets information indicating a present date and time obtained from the clock circuit 54 as photographing date and time information.

When image data captured through the external I/F 9 is recorded in the external recording mode, the control unit 5 of the image pickup device sets "0" to the original recorded file flag of the image data, and sets information indicating a present date and time obtained from the clock circuit 54 as correction date and time information.

It is thus possible to clearly distinguish between image data obtained by photographing by the image pickup device according to the present embodiment and image data obtained through the external I/F, and surely grasp dates and times when the image pickup device captured the image data.

When a classification process is performed according to photographing dates and times as with a conventional classification process, the image pickup device according to the present embodiment performs the classification process on the basis of photographing date and time information b or bb for image data obtained by photographing by the image pickup device (image data whose original recorded file flag is "1"), and performs the classification process on the basis of correction date and time information c or cc for image data obtained externally through the external I/F 9 (image data whose original recorded file flag is "0").

Incidentally, the image pickup device according to the present embodiment can use either the system described with reference to FIG. 2, which system manages image data and managing information therefor integrally, or the system described with reference to FIG. 3 and FIG. 4, which system separates image data from managing information therefor and collectively manages only the managing information together with managing information for other image data. For a quicker classification process, however, the image pickup device according to the present embodiment preferably uses the system described with reference to FIG. 3 and FIG. 4, which system separates managing information from image data and collectively manages the managing information.

Process of Classifying Image Data Recorded on Recording Medium

The flow of a series of processes in classifying image data recorded as files on the recording medium according to photographing date and time information will next be described with reference to the flowchart of FIG. 5. The process shown in FIG. 5 is performed by the control unit 5.

When classifying images recorded on the recording medium 10 loaded in the image pickup device according to the present embodiment according to photographing date and time information, the CPU 51 of the control unit 5 first refers to the original recorded file flag aa of each property entry in the property file as AV managing information, and determines whether the original recorded file flag aa is "0" or "1" (step S1).

When the CPU 51 determines that the original recorded file flag is "0" in the determination process of step S1, the CPU 51 refers to the correction date and time information of the image data (step S2). When the CPU 51 determines that the original recorded file flag is "1" in the determination process of step S1, the CPU 51 refers to the photographing date and time information of the image data (step S3). The CPU 51 performs a classification process using the referred-to date and time information as a classification key (step S4).

Then, the CPU 51 provides a result of classification to the user by displaying the result of classification together with date image information such as calendar information or the like on the LCD 8, as will be described later in detail, to provide the result of classification such that the result of classification is easily comprehensible to the user (step S5). Then the process shown in FIG. 5 is ended.

Thus, when image data recorded on the recording medium is classified by photographing date and time information, image data obtained via an external device or a network is not classified into unexpected dates, and image data can be classified according to a photographing date and time or an obtainment date and time as a date and time when the image pickup device first captured the image data recorded on the recording medium (date and time when the user intended (decided) to obtain the image), that is, according to date and time information that the user knows.

Therefore, since image data obtained via an external device or a network is not classified into unexpected dates, no confusion or the like is caused in retrieving a desired image, for example. In addition, by displaying a result of classification together with date information such as calendar information or the like, the result of image classification can be easily checked visually.

Providing Result of Classification to User

An example of the display of a result of classification will next be described. FIG. 6 is a diagram of assistance in explaining an example of a classification result providing image for displaying a result of classification on date image information (calendar information) for two weeks.

In the example shown in FIG. 6, the date image information 81 for two weeks is displayed on the display screen of the LCD 8, and when there is image data having date and time information corresponding to the date of a date section on the date image information 81, a representative image (a thumbnail image, an icon image or the like) indicating the presence of the image data having the date and time information corresponding to the date of the date section is displayed in the date section. In the example shown in FIG. 6, representative images G1, G2, G3, and G4 are displayed in respective date sections of a first day, a sixth day, a ninth day, and a 12th day, the representative images G1, G2, G3, and G4 indicating that there are image data obtained on those dates.

Each of the representative images G1, G2, and G3 in the example shown in FIG. 6 indicates that image data captured by photographing on the day corresponding to the displayed date section by the image pickup device according to the present embodiment is recorded on the recording medium. The representative image G4 indicates that image data captured externally through the external I/F 9 on the day corresponding to the displayed date section is recorded on the recording medium.

Incidentally, the image data captured on the 12th day may include not only image data captured externally, but also image data obtained by photographing by the own device. When there is even one piece of image data captured externally, the presence of the externally captured image data on the recording medium is indicated in the mode shown by G4 in FIG. 6.

In this case, when the externally provided image data represented by the representative image G4 is an image actually photographed on a third day, a conventional technique displays a representative image G4X as indicated by a dotted line in the date section of the third day in FIG. 6. However, the image pickup device according to the present embodiment classifies the image data according to the date and time of obtainment (date and time of capture) of the image data. Therefore, the representative image G4 is displayed on January 12 in this example.

Incidentally, the representative images may be icons indicating that associated image information is present in the corresponding date sections of the date image information, as in the example shown in FIG. 6, and may be thumbnail images of corresponding images. In the case of thumbnail images, thumbnail images in thumbnail entries described with reference to FIG. 4 are used. When the managing information managing system is the system described with reference to FIG. 2, the thumbnail data shown in FIG. 2 is used.

When there are a plurality of pieces of thumbnail image data having different resolutions for a same image, a thumbnail image having a resolution as required is displayed and selected. Further, when icons are displayed as representative images, as in the example of FIG. 6, the icons may be displayed in different colors to distinguish between the images obtained by photographing by the image pickup device according to the present embodiment and the images obtained from other devices, or only icons simply indicating that images associated with dates on the date image information are recorded on the recording medium may be displayed.

An up arrow mark 8up and a down arrow mark 8dw in FIG. 6 are icons indicating directions in which operation is possible when displayed dates (display range) on the date image information 81 are changed by a cross key or an arrow key, for example, of the operating unit 6 shown in FIG. 1. When the downward direction of the cross key is specified in a display state shown in FIG. 6, the date image information 81 shown in FIG. 6, for example, is scrolled to the next two weeks, for example, on the LCD 8. That is, screen scrolling (screen display scrolling) is performed so that a result of classification for the next two weeks not displayed on the display screen at present is displayed on the display screen.

A cursor CS in FIG. 6 is a designator for selecting and designating a desired date section. When details of images classified into a desired date section are to be checked, for example, the cursor CS is used to designate the desired date section.

Figure 7:
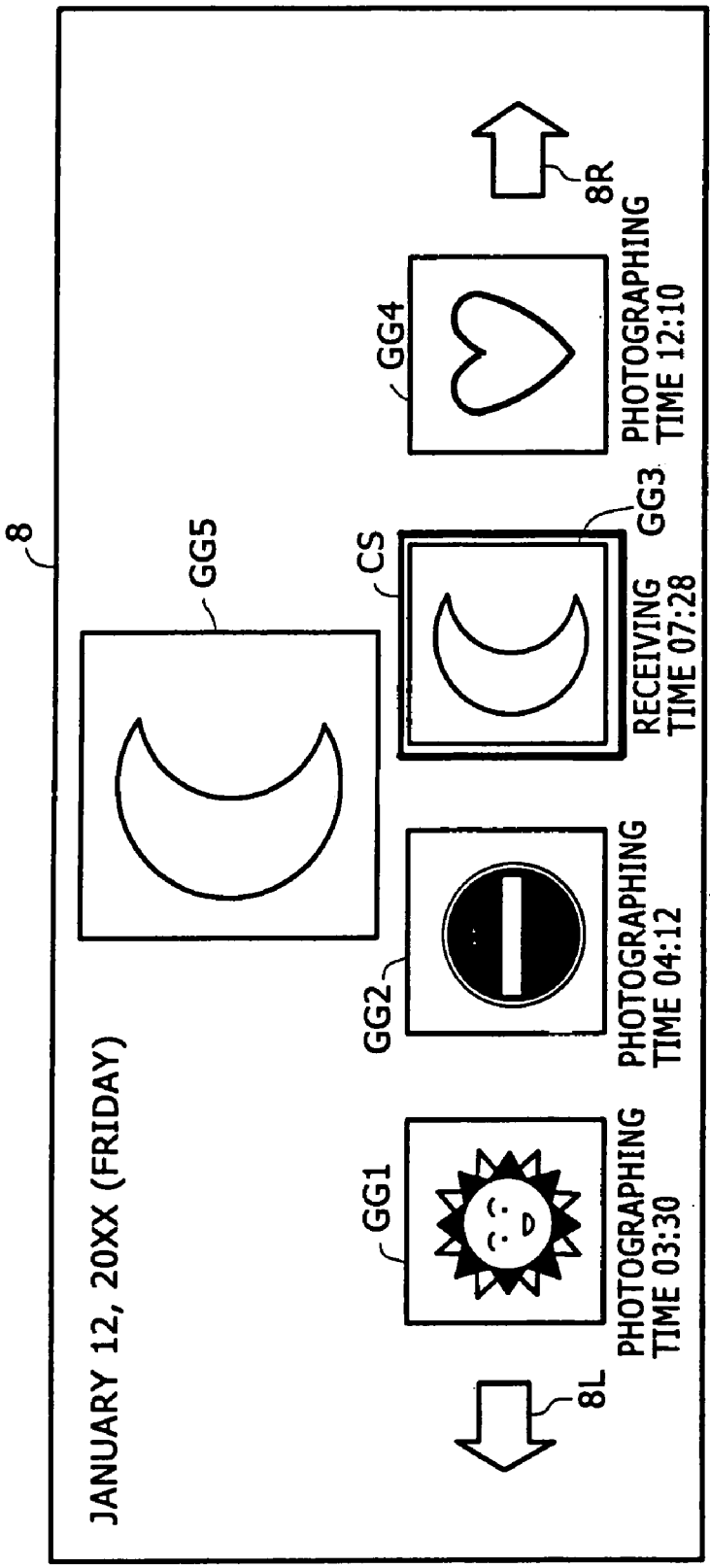
FIG. 7 is a diagram of assistance in explaining an example of image display when images classified into a date section are checked.

A description will next be made of an example of the display of images when details of the images classified into a date section designated by the cursor CS are checked. FIG. 7 is a diagram of assistance in explaining an example of the display of images when the images classified into a date section designated through the cursor CS are checked.

In the display example shown in FIG. 7, a plurality of images classified into a date section designated through the cursor CS, as shown in FIG. 6, are displayed on the display screen of the LCD 8. In the example shown in FIG. 7, it is indicated that there are at least four images obtained by photographing by the image pickup device according to the present embodiment or obtained from an external device through the external I/F 9 on January 12 (Friday), 20XX.

In this example, thumbnail images GG1, GG2, GG3, and GG4 of the images classified into the designated date are displayed on the lower side of the LCD 8. In addition, for the thumbnail image at which the cursor CS is positioned, an image GG5 having a higher resolution than the thumbnail image is displayed on the display screen of the LCD 8.

With such a constitution, a desired image is selected through a thumbnail image displayed in the lower side part of the display screen of the LCD 8, and the image GG5 having a higher resolution than the selected image is displayed to be checked and selected by the user.

In the example shown in FIG. 7, a photographing time or a receiving time is displayed under each thumbnail image displayed in the lower side part of the LCD 8, and the thumbnail images as a whole are displayed in advancing order of photographing time from the left. The displayed thumbnails are retained in thumbnail entries shown in FIG. 4. Incidentally, when image data managing information is managed by the system shown in FIG. 2, thumbnail data d shown in FIG. 2 is used.

When a plurality of pieces of thumbnail image data having different resolutions are possessed for the same image, a thumbnail image having a resolution as required is selected and displayed. When a plurality of thumbnail images having different resolutions are thus possessed in advance, the time for converting resolution is reduced. Therefore, when the thumbnail images arranged and displayed on the lower side of the LCD 8 are selected, the thumbnail image GG5 displayed on the upper side of the LCD 8 can be displayed quickly.

Further, in the image pickup device according to the present embodiment, display control when a result of classification is displayed on the display screen of the LCD 8 to be provided to the user is devised so that the result of classification can be provided in a mode more convenient to the user.

As shown in FIG. 6, the image pickup device according to the present embodiment can display a result of classification for two weeks on the display screen of the LCD 8. In this case, consideration will be given to a case where there is no image data classified into dates from a 13th day (Saturday) to a 29th day (Monday), for example, as shown in FIG. 8. In practice, it is considered that there are not so many users who photograph images or obtain image data from an external device every day. Therefore, a case where recorded image data is not classified into a plurality of consecutive days is supposed.

If a display process is performed for a period into which no image data is classified in the same manner as for a period including days into which image data is classified, only date image information unnecessary for the user may be provided, and an inconvenience of taking time to retrieve a desired image, for example, can result.

In order to solve this problem, the image pickup device according to the present embodiment sets, as a skipped area, a period of two weeks from a 15th day to a 28th day, which period does not have days into which image data is classified, and does not display an image showing date image information and a result of classification for this period. Suppose that an area R1 shown in FIG. 8 is displayed on the display screen of the LCD 8 as shown in FIG. 6.

In this case, when an instruction for scrolling is given and no image is classified into any days included in an area R2 to be displayed next, the period of two weeks corresponding to the area R2 is skipped, and calendar information and a result of classification for the period are not displayed. Thus, a period during which a process of capturing image data is not performed and which thus has no days into which images are classified is skipped and not displayed. When an area including a day into which an image is classified is detected, a result of classification for the area is displayed.

Hence, in the example shown in FIG. 8, when an instruction for scrolling is given after a result of classification for the area R1 is displayed, the area R2 is skipped, and a result of classification for the next area R3 is displayed.

It is thereby possible to make effective use of the display screen of the LCD, which display screen is limited in size, to quickly provide the user with a result of classification of images recorded on the recording medium, and reduce the time to find a desired image from the images recorded on the recording medium.

Incidentally, in the example shown in FIG. 8, the display position of a date section of the 30th day (Tuesday) into which an image is classified can be displayed at an uppermost left corner on the display screen of the LCD 8. However, the same day of the week preferably is arranged on a vertical axis so that the correspondence of a date-related image after scrolling is easier to perceive visually.

Control of Scroll Speed

However, while an area in which images recorded on the recording medium are not present on dates on the date image information as shown in FIG. 8 on the display screen of the LCD 8 may be skipped in scrolling, continuous date image information cannot be provided, and thus an advantage of using the date image information visually can be impaired.

That is, even though a result of classification is displayed so as to correspond to familiar date information such as a calendar, skipping can provide the result of classification quickly but may result in display of an image unlike a calendar (a mere date image).

Accordingly, by not skipping an area that does not include dates into which images are classified, and in this case increasing a scroll speed to a degree that a displayed image can be visually checked, the result of classification can be displayed and provided to the user together with date image information corresponding to a calendar, including days into which images are not classified, without discontinuity of dates. Thereby, a result of classification of images is provided to the user in such a manner as to be easily understandable without the meaning of calendar information being impaired, so that the result of classification can be recognized easily.

Adjustment of scroll speed will be described in the following. A process of scrolling a displayed image will be described below by taking as an example a case where a result of classification is displayed together with date image information for two weeks as shown in FIG. 6. An ordinary process of scrolling an image will first be described with reference to FIG. 9A and FIG. 9B.

Generally, image scrolling is performed by operating a predetermined operating button, such as, for example, a scroll button switch (hereinafter referred to simply as a scroll button). FIG. 9A and FIG. 9B show a scroll button on/off signal switched to an on/off state in response to an operation of the scroll button. The scroll button on/off signal is ON during a period that the scroll button is pressed, and is OFF during a period that the scroll button is not pressed.

In this case, when the scroll button is pressed, and the pressing operation is stopped within a predetermined time (within one second in the example of FIG. 9A), scrolling by one week is performed. Thus, by repeating the operation of pressing the scroll button within one second, the displayed image can be scrolled by one week at a time.

Then, when the scroll button continues being pressed, as shown in FIG. 9B, scrolling (movement of the image) by one week is performed consecutively at intervals of a predetermined time (at intervals of 0.2 seconds in the example of FIG. 9B) after passage of a predetermined time (after passage of one second from a start of the pressing operation in the example of FIG. 9B). Thus, when the scroll button continues being pressed, scrolling is repeated automatically after the passage of the predetermined time.

However, in the case of the ordinary scrolling of the displayed image as described with reference to FIG. 9A and FIG. 9B, scrolling is performed for a period including consecutive days that no images were captured in the same manner as for a period including a day that an image was captured. Thus, in this case, in contrast to the above-described skipping process, an inconvenience of taking time to retrieve a desired image, for example, can result.

Accordingly, as will be described below, the scroll speed is controlled according to the number of image data files (recorded files) within a display range, thereby making it possible to find a desired image data file quickly. In addition, utilizing a tendency for the number of image data files classified into a date when an important event such as a wedding, travel or the like took place to increase, this control makes it easier to find image data files for such events.

First Example of Control of Scroll Speed

FIG. 10 is a diagram showing an example of a result of the classification process described with reference to FIG. 5. In the example shown in FIG. 10, the number of recorded images (the number of image data files) for a week (b) as a scroll unit is five; the number of recorded images for a week (c) as a scroll unit is 11; the number of recorded images for a week (d) as a scroll unit is zero; the number of recorded images for a week (e) as a scroll unit is zero; the number of recorded images for a week (f) as a scroll unit is three; and the number of recorded images for a week (g) as a scroll unit is one.

On the basis of the result of classification shown in FIG. 10, consideration will be given to a case where scrolling is performed in a forward direction from a state of a period of two weeks (a) and (b) being displayed as enclosed by a rectangle in FIG. 10 to a state of a period of two weeks (g) and (h) being displayed, and to a case where scrolling is performed in an opposite direction from the state of the period of the two weeks (g) and (h) being displayed to the state of the period of the two weeks (a) and (b) being displayed, and the scrolling is performed automatically by an auto-repeat function.

In this example, a scroll repeat interval T is determined by an operation on the basis of the number N of image data files that go outside a display range as a result of a next movement of the display range by the operation of pressing the scroll button. In other words, when scrolling is performed in a forward direction, the repeat interval is set according to the number of image data files classified into a period of a first week being currently displayed. The larger the number of image data files classified into the period of the first week being currently displayed, the longer the repeat interval, so that a result of classification for the week is displayed for a longer time.

Suppose in this case that the auto-repeat function is performed after 0.9 seconds from the operation of pressing the scroll button. In this case, letting N be the number of files that go outside the display range as a result of a next movement of the display range by pressing the scroll button, the repeat interval T after passage of 0.9 seconds from the operation of pressing the scroll button is $$T=F(N)=0.1\times(1+N) \qquad \text{(Equation 1)}$$

Hence, supposing that the week (b) goes outside the display range as a result of a next movement of the display range, the number of image data files classified into the week (b) is five, and when the number is substituted into (Equation 1), $T=0.1\times(1+5)=0.6$ seconds. Similar calculation is performed for the weeks (c) to (f). In the case of the week (c), the number N of image data files is 11, and hence T=1.2 seconds. In the case of the weeks (d) and (e), the number N of image data files is zero, and hence T=0.1 seconds. In the case of the week (f), the number N of image data files is three, and hence T=0.4 seconds. In the case of the week (g), the number N of image data files is one, and hence T=0.2 seconds.

Hence, when scrolling is performed in a forward direction from the state of the period of the two weeks (a) and (b) being displayed to the state of the period of the two weeks (g) and (h) being displayed, the repeat interval T after 0.9 seconds from the operation of pressing the scroll button is changed from 0.6 seconds to 1.2 seconds to 0.1 seconds to 0.1 seconds to 0.4 seconds (to 0.2 seconds). When plotted in correspondence with the scroll button on/off signal, this is as shown in FIG. 11A.

According to FIG. 11A, when the scroll button is pressed in the state of the period of the two weeks (a) and (b) being displayed, a change is made instantly to display of (b) and (c). At a point in time after passage of 0.9 seconds and further passage of 0.6 seconds (a point in time after 1.5 seconds from the pressing operation), a change is made to display of (c) and (d).

At a point in time after passage thereafter of 1.2 seconds (a point in time after 2.7 seconds from the pressing operation), a change is made to display of (d) and (e). Since no image data is classified into the weeks (d) and (e), the weeks (e) and (f) are displayed and then the weeks (f) and (g) are displayed at intervals of 0.1 seconds. At a point in time after passage of 0.4 seconds after this display (a point in time after 3.3 seconds from the pressing operation), a change is made to display of (g) and (h).

When scrolling is performed in an opposite direction from the state of the period of the two weeks (g) and (h) being displayed to the state of the period of the two weeks (a) and (b) being displayed, the repeat interval T is changed in opposite order from that in the case of the above-described scrolling in the forward direction from the display of (a) and (b) to the display of (g) and (h). In this case, the repeat interval after 0.9 seconds from a point in time of the operation of pressing the scroll button is changed from 0.2 seconds to 0.4 seconds to 0.1 seconds to 0.1 seconds to 1.2 seconds (to 0.6 seconds). When plotted in correspondence with the scroll button on/off signal, this is as shown in FIG. 11B.

According to FIG. 11B, when the scroll button is pressed in the state of the period of the two weeks (g) and (h) being displayed, a change is made instantly to display of (f) and (g). At a point in time after passage of 0.9 seconds and further passage of 0.2 seconds (a point in time after 1.1 seconds from the pressing operation), a change is made to display of (e) and (f).

At a point in time after passage thereafter of 0.4 seconds (a point in time after 1.5 seconds from the pressing operation), a change is made to display of (d) and (e). Since no image data is classified into the weeks (d) and (e), the weeks (c) and (d) are displayed and then the weeks (b) and (c) are displayed at intervals of 0.1 seconds. At a point in time after passage of 1.2 seconds after this display (a point in time after 2.9 seconds from the pressing operation), a change is made to display of (a) and (b).

As shown in FIG. 11A and FIG. 11B, the scroll speed is increased for weeks into which a small number of image data files are classified, and the scroll speed is decreased for weeks into which a large number of image data files are classified. It is thereby possible to make effective use of calendar information, and retrieve desired image data quickly and surely.

Second Example of Control of Scroll Speed

Figure 12:
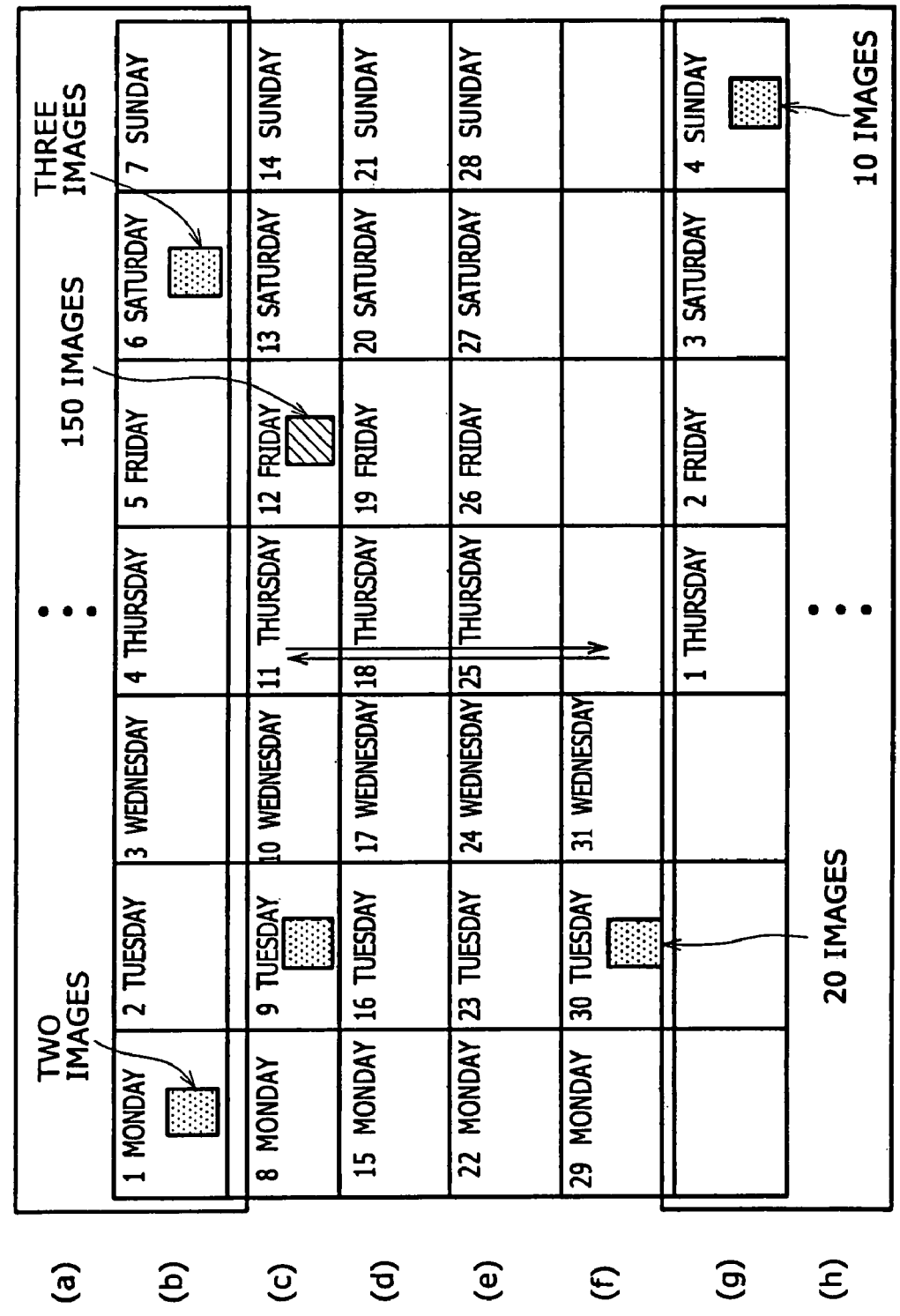
FIG. 12 is a diagram showing another example of a result of classification of image data and a scroll speed control process.

Consideration will next be given to a case where there are a large number of image data files (number of images), for example a few tens of files or a few hundred files classified into a period of one week as a display unit. FIG. 12 is a diagram showing an example of a result of the classification process described with reference to FIG. 5. In the example shown in FIG. 12, the number of recorded images (the number of image data files) for a week (b) as a scroll unit is five; the number of recorded images for a week (c) as a scroll unit is 150; the number of recorded images for a week (d) as a scroll unit is zero; the number of recorded images for a week (e) as a scroll unit is zero; the number of recorded images for a week (f) as a scroll unit is 20; and the number of recorded images for a week (g) as a scroll unit is 10.

Thus, in the case where there is a week into which a very large number of image data files are classified, when the above-described (Equation 1) is used as an equation for determining the repeat interval T, it takes more than 15 seconds to change from display of a period of the two weeks (c) and (d) to display of a period of the two weeks (d) and (e), which is not very practical. The same is true for changing from display of a period of the two weeks (b) and (c) to display of a period of the two weeks (a) and (b) by reverse scrolling.

Accordingly, the second example of control of the scroll speed uses a logarithmic function having a base of 2 as an equation for calculating the repeat interval T. Specifically, suppose that an auto-repeat function is performed after 0.9 seconds from the operation of pressing the scroll button, as in the foregoing first example of control of the scroll speed. Letting N be the number of files that go outside a display range as a result of a next movement of the display range by pressing the scroll button, the repeat interval T after passage of 0.9 seconds from the operation of pressing the scroll button is $$T=F(N)=0.1\times(1+\log 2(N+1)) \quad \text{(Equation 2)}$$

By thus using the logarithmic function, practical scroll timing is obtained. In this case, the fractional part of the logarithmic function in (Equation 2) is discarded.

Hence, when scrolling is performed in a forward direction from a state of a period of the two weeks (a) and (b) being displayed to a state of a period of the two weeks (g) and (h) being displayed, the repeat interval T after 0.9 seconds from the operation of pressing the scroll button is changed from 0.3 seconds to 0.8 seconds to 0.1 seconds to 0.1 seconds to 0.5 seconds (to 0.4 seconds). When plotted in correspondence with a scroll button on/off signal, this is as shown in FIG. 13A.

Figure 13:
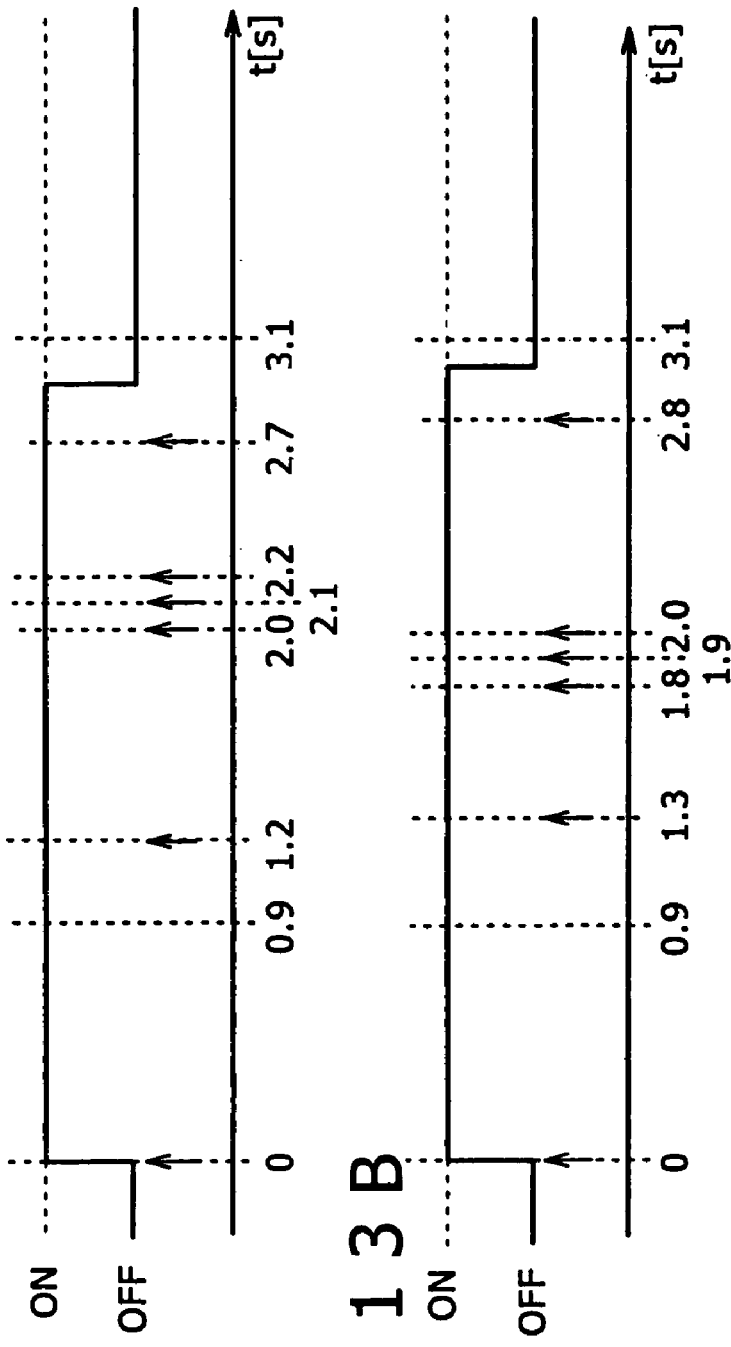
FIG. 13A and FIG. 13B are diagrams of assistance in explaining another example of the scroll speed control process.

According to FIG. 13A, when the scroll button is pressed in the state of the period of the two weeks (a) and (b) being displayed, a change is made instantly to display of (b) and (c). At a point in time after passage of 0.9 seconds and further passage of 0.3 seconds (a point in time after 1.2 seconds from the pressing operation), a change is made to display of (c) and (d).

At a point in time after passage thereafter of 0.8 seconds (a point in time after 2.0 seconds from the pressing operation), a change is made to display of (d) and (e). Since no image data is classified into the weeks (d) and (e), the weeks (e) and (f) are displayed and then the weeks (f) and (g) are displayed at intervals of 0.1 seconds. At a point in time after passage of 0.5 seconds after this display (a point in time after 2.7 seconds from the pressing operation), a change is made to display of (g) and (h).

When scrolling is performed in an opposite direction from the state of the period of the two weeks (g) and (h) being displayed to the state of the period of the two weeks (a) and (b) being displayed, the repeat interval T is changed in the opposite order from that in the case of the above-described scrolling in the forward direction from the display of (a) and (b) to the display of (g) and (h). In this case, the repeat interval after 0.9 seconds from a point in time of the operation of pressing the scroll button is changed from 0.4 seconds to 0.5 seconds to 0.1 seconds to 0.1 seconds to 0.8 seconds (to 0.3 seconds). When plotted in correspondence with the scroll button on/off signal, this is as shown in FIG. 13B.

According to FIG. 13B, when the scroll button is pressed in the state of the period of the two weeks (g) and (h) being displayed, a change is made instantly to display of (f) and (g). At a point in time after passage of 0.9 seconds and further passage of 0.4 seconds (a point in time after 1.3 seconds from the pressing operation), a change is made to display of (e) and (f).

At a point in time after passage thereafter of 0.5 seconds (a point in time after 1.8 seconds from the pressing operation), a change is made to display of (d) and (e). Since no image data is classified into the weeks (d) and (e), the weeks (c) and (d) are displayed and then the weeks (b) and (c) are displayed at intervals of 0.1 seconds. At a point in time after passage of 0.8 seconds after this display (a point in time after 2.8 seconds from the pressing operation), a change is made to display of (a) and (b).

As shown in FIG. 13A and FIG. 13B, the scroll speed can be set to be an appropriate speed even when there are a large number of image data files classified, for example a few tens of files or a few hundred files. In addition, the scroll speed is increased for weeks into which a small number of image data files are classified, and the scroll speed is decreased for weeks into which a large number of image data files are classified.

That is, even when there are a large number of pieces of image data classified, for example a few tens of pieces of image data or a few hundred pieces of image data, an image showing a result of classification can be scrolled at an appropriate scroll speed. It is thus possible to make effective use of calendar information, and retrieve desired image data quickly and surely.

Figure 14:
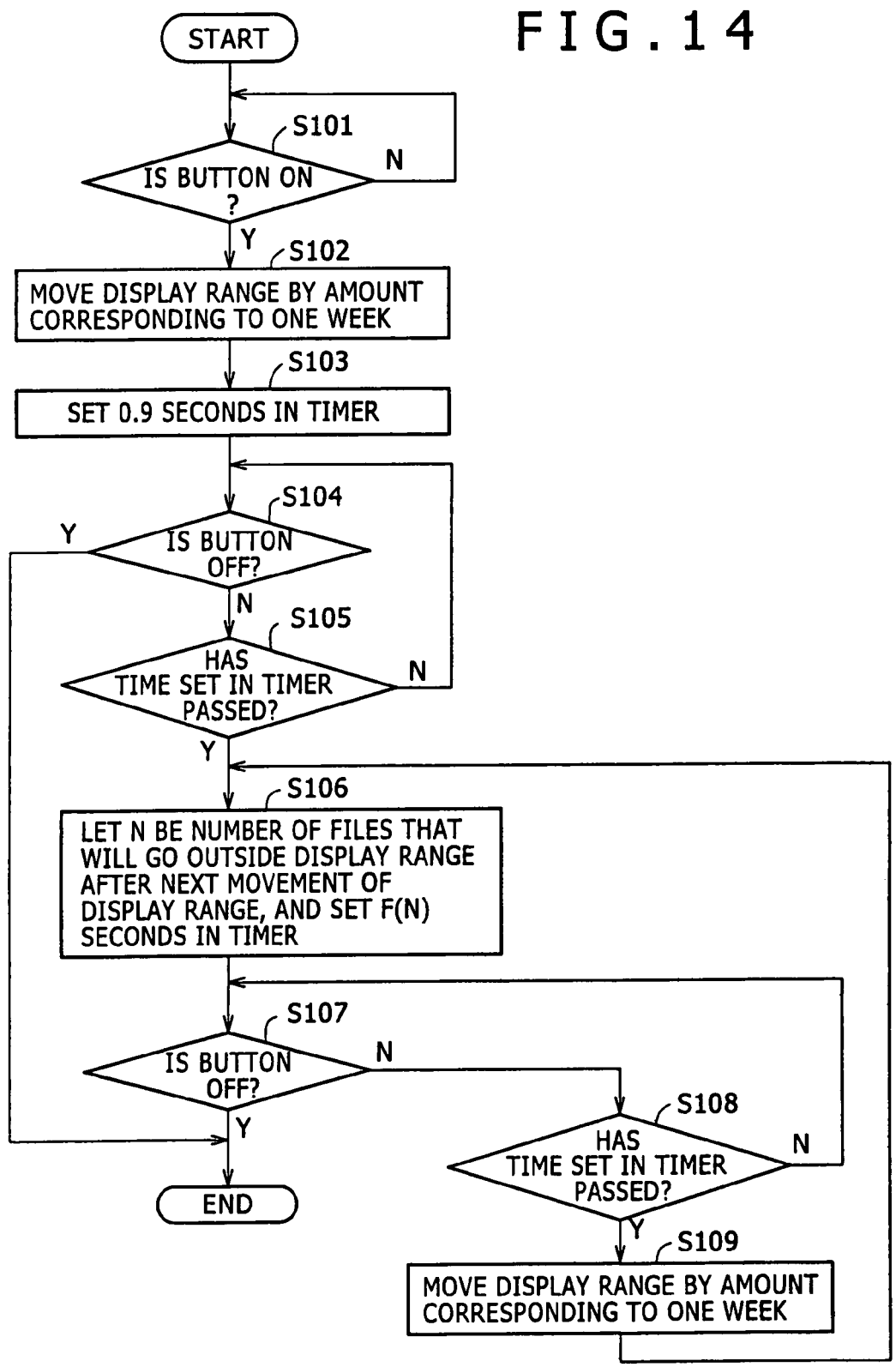
FIG. 14 is a flowchart of assistance in explaining the scroll speed control process.

The above-described first and second processes of controlling the scroll speed will next be described concretely with reference to the flowchart of FIG. 14. That is, in the first example of control of the scroll speed and the second example of control of the scroll speed described above, only the operational equation for determining the repeat interval T differs, and other process parts are performed in substantially the same manner.

The scroll speed is controlled by the control unit 5 in the image pickup device according to the present embodiment. After display of a result of classification on the display screen of the LCD 8, the CPU 51 of the control unit 5 monitors whether the scroll button of the operating unit 6 has been pressed (step When the CPU 51 determines in the determination process of step S101 that the scroll button has been pressed, the CPU 51 scrolls the displayed image in a specified direction by one week (step S102). In the present embodiment, to wait for a period of 0.9 seconds as an interval time after which the scroll auto-repeat function is enabled, 0.9 seconds is set in a timer (clock circuit 54), and measurement of the period of 0.9 seconds is started (step S103).

Then, the CPU 51 determines whether the operation of pressing the scroll button has ended (step S104). When the CPU 51 determines that the operation of pressing the scroll button has ended during the set period of 0.9 seconds, the process represented in FIG. 14 is ended. When the CPU 51 determines in the determination process of step S104 that the operation of pressing the scroll button continues, the CPU 51 determines whether the timer set in step S103 has completed the measurement of the period of 0.9 seconds (whether 0.9 seconds has passed from the start of the operation of pressing the scroll button) (step S105).

When the CPU 51 determines in the determination process of step S105 that 0.9 seconds has not passed from the start of the operation of pressing the scroll button, the CPU 51 repeats the process from step S104. When the CPU 51 determines in the determination process of step S105 that 0.9 seconds has passed from the start of the operation of pressing the scroll button, the CPU 51 sets N as the number of image data files that go outside a display range as a result of a next movement of the display range, calculates the repeat interval F(N) in seconds according to a predetermined calculation equation as represented by (Equation 1) or (Equation 2), for example, and sets the timer to measure the calculated period of time (step S106).

Then, the CPU 51 again determines whether the operation of pressing the scroll button has ended (step S107). When the CPU 51 determines that the operation of pressing the scroll button has ended, the process represented in FIG. 14 is ended.

When the CPU 51 determines in the determination process of step S107 that the operation of pressing the scroll button continues, the CPU 51 determines whether the timer set in step S106 has completed the measurement of a period of the repeat interval T determined by the calculation (step S108).

When the CPU 51 determines in the determination process of step S108 that the timer set in step S106 has not completed the measurement of the period of the repeat interval T determined by the calculation, the CPU 51 repeats the process from step S107. When the CPU 51 determines in the determination process of step S108 that the timer set in step S106 has completed the measurement of the period of the repeat interval T determined by the calculation, the CPU 51 scrolls the display range by one week in a direction specified by the user (step S109). Then the process from step S106 is repeated.

Thereby, as described above, it is possible to scroll an image showing a result of classification at an appropriate scroll speed according to the result of classification, and thus retrieve a desired image quickly. In addition, a period into which no images are classified is prevented from not being displayed by being skipped, and is displayed without fail, if only displayed for a short time. Thus, calendar information can be provided in a correct mode.

Other Examples of Control of Scroll Speed

As the calculation equation F(N) for calculating the repeat interval T, various equations can be used in addition to the above-described (Equation 1) and (Equation 2), such as an equation obtained by providing an upper limit value and a lower limit value in (Equation 1), an equation obtained by using other than two as the base of the logarithmic function in (Equation 2), and the like. Also, various calculation equations F(N) may be selected by a user operation or an automatic process so that an optimum equation is selected and used.

A parameter in (Equation 2) may be not only the number N of images but also a recording time or a file volume in the case of a moving image. Of course, the value of the base in (Equation 2) may be changed according to the parameter. Further, functions other than the logarithmic function can be used, and a new function may be defined for control of the scroll speed.

That is, it is possible to use various functions that decrease the scroll speed as the number N of pieces of image data classified is increased. However, the scroll speed may become slower than necessary as the number N of pieces of image data classified is increased. By setting a lower limit of the scroll speed in advance, it is possible to prevent the scroll speed from becoming slower than necessary.

Further, it is needless to say that a function for determining the repeat interval T may assume a linear value or a nonlinear value. When the repeat interval T is set to zero, the scroll speed is infinite, and thus the same operation as in the case of the above-described skip is obtained.

While in the above-described embodiment, an image for displaying a result of classification is scrolled by a unit of one week, the present invention is not limited to this. A smooth scrolling process is performed by continuously scrolling a displayed image by very small units, such as, for example, pixel units, and of course the speed of the scrolling can be changed by a parameter.

In addition, while in the above-described embodiment, a criterion for determining a parameter such as the number of image data files (the number of images) or the like is "the number of images that go outside a display range as a result of a next movement of the display range," the present invention is not limited to this. For example, the criterion may be a predetermined criterion such as "the number of images classified into a week that comes within the display range as a result of a next movement of the display range," "the number of images in the display range as a whole," or "the number of images as a sum weighted according to the distance from a display center, including a vicinity of the display range."

When weighting is performed, a speed change itself in continuous scrolling can be smoothed for easier viewing by devising weighting. Specifically, a horizontal line as a display center is set as a reference, and a higher weight is assigned to a week whose display center is closer to the reference and the weight is lightened as the distance from the reference is increased. Thereby, the scroll speed can be increased when the center of display of a week having a large number of images is distant from the reference, and the scroll speed is decreased as the center of display of the week becomes closer to the reference.

The control of the scroll speed by weighting will be described concretely with reference to FIGS. 15A to 17. Consideration will be given to a case where, as shown in FIG. 15A, there is image information for a result of classification for five weeks from a 0th week (first week) to a 4th week (fifth week), and image information for a result of classification for two weeks is displayed within one screen as in the foregoing embodiment.

Suppose that the numbers of images classified into respective weeks from the 0th week to the 4th week in FIG. 15A are N0, N1, N2, N3, and N4. A part enclosed by a thick line in FIG. 15A is classification result image information displayed on a display screen G, and is a part displayed at time T0.

When contents displayed on the display screen G are scrolled to change from a state of display at time T0 as shown in FIG. 15A to display at time T1 as shown in FIG. 15B, the position of a center line in a horizontal direction of the display screen G (a horizontal line that divides the display screen G into an upper part and a lower part) is set as a reference position, and distances d0, d1, d2, d3, and d4 to the positions of centers in the horizontal direction of display images of results of classification for the respective weeks (centers of the display images for the respective weeks) are obtained. Incidentally, in FIG. 15B, the centers in the horizontal direction of the display images of the results of classification for the respective weeks are represented by a dotted line.

Figures 16, 17:
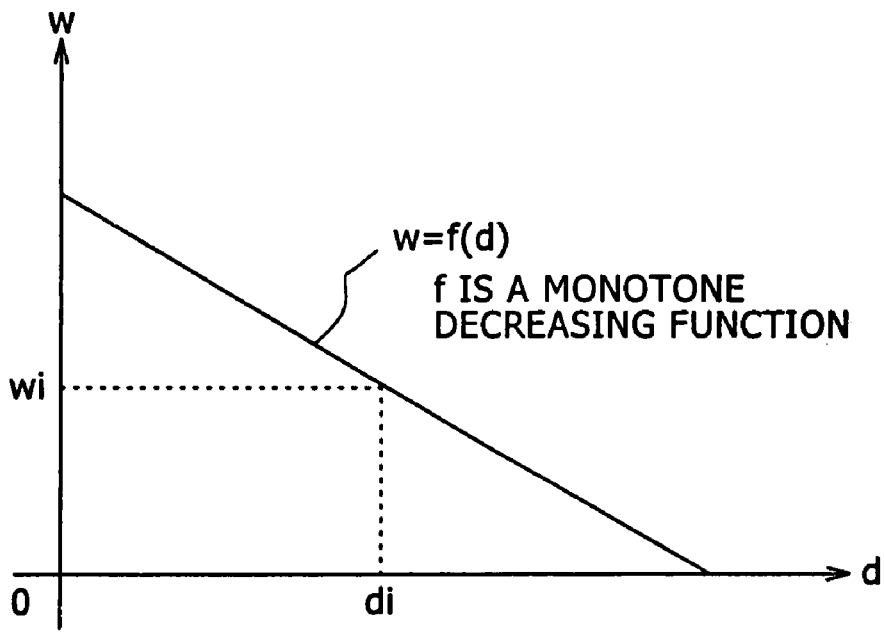
FIG. 16 is a diagram of assistance in explaining the scroll speed control with weighting taken into consideration.
FIG. 17 is a diagram showing an example of calculation equations used when the scroll speed control with weighting taken into consideration is performed.

The scroll speed is controlled on the basis of the distances d0, d1, d2, d3, and d4 from the center line of the display screen G to the centers of the display images of the results of classification for the respective weeks and the numbers N0, N1, N2, N3, and N4 of images classified into the respective weeks. Specifically, as shown in FIG. 16, a monotonically decreasing function f(d) that decreases as the distance d from the reference position is increased is defined, and a value given by the function f(d) is set as a weighting factor w. Incidentally, f(d) shown in FIG. 16 may be not only a continuous monotonically decreasing function, but also a step function assuming a constant factor w according to a range of the distance d.

Then, a value X is obtained by (Equation 3) shown in FIG. 17 according to the numbers of images classified into weeks in the vicinity of the week whose classification result is currently displayed and the distances from the center line of the display screen G as the reference position shown in FIG. 15B to the positions of the centers in the horizontal direction of the display images of the results of classification for the respective weeks (centers of display of the respective weeks). This value X can be said to be, as it were, a weighted amount of images. As represented by (Equation 4) in FIG. 17, a reciprocal of a value F(X) obtained by (Equation 3) in FIG. 17 and the above-described (Equation 1) or (Equation 2) is used as a scroll speed V. Incidentally, as shown in (Equation 3) in FIG. 17, a parameter i for a symbol sigma in (Equation 3) is one to four in this example.

It is thus possible to control the image scroll speed according to the numbers of images classified into weeks in the vicinity of the week whose classification result is currently displayed and the distances from the center in the horizontal direction of the display screen G to the centers of the display images for the respective adjacent weeks to be processed, and therefore perform a smoother scrolling process.

It is to be noted that while the above description has been made by taking as an example a case where display information for a result of classification for two weeks is displayed within one screen, the present invention is not limited to this. The above system can be used even when more information is displayed, and a range to be processed can be extended or reduced from five weeks.

Incidentally, as is clear from the above description, in the example of the image pickup device described in the present embodiment, the control unit 5 realizes the functions of classifying means and detecting means, and the control unit 5 and the LCD controller 7 realize the functions of display control means.

The operating unit 6 and the control unit 5 realize the functions of instructing means. The camera unit 1 and the camera DSP 2 realize image pickup means. The external I/F 9 and the control unit 5 realize receiving means for receiving external image data and recording the image data on a recording medium.

Electronic Devices to which the Invention is Applicable

While the foregoing embodiment has been described by taking as an example a case where the present invention is applied to a digital camera capable of taking a still image and a moving image, the present invention is not limited to this. For example, the present invention is applicable to various electronic devices such as digital still cameras for taking a still image, digital video cameras for taking a moving image, portable telephone terminals with a camera, portable information terminals referred to as PDAs (Personal Digital Assistants), personal computers or the like.

That is, the present invention is applicable to an electronic device that has a function of capturing information independently in the own device and recording the information as digital data on a recording medium, and a function of being supplied with digital data via an external device or a network and recording the digital data on the recording medium, as is the case with the digital camera according to the foregoing embodiment.

Thus, the digital data captured and recorded on the recording medium and to be classified is not limited to image data, and the present invention is applicable in cases where various digital data other than image data, such as text data, program data and the like, is handled.

In the case of a portable telephone terminal with a camera, for example, since the display screen of a display element such as an LCD, an organic EL element or the like mounted in the portable telephone terminal is relatively small, it can be difficult to display a result of classification together with calendar information as in the foregoing embodiment. Accordingly, an electronic device having a display element with only a small display screen, such as a portable telephone terminal with a camera, performs a classification process in the same manner as the digital camera according to the foregoing embodiment, but displays a result of classification with date information for reference.

Specifically, a portable telephone terminal with a camera records image data obtained by photographing by the own device and recorded on a recording medium or image data obtained through an external device or a network as a file on the recording medium, and manages the image data with managing information such as an original recorded file flag, photographing date and time information, correction date and time information used also as obtainment date and time information, and the like.

It is possible to use, as a managing system in this case, both a system of integral management including thumbnail data within the same file, which system has been described with reference to FIG. 2, and a system of managing the managing information in a file separate from an image data file, which system has been described with reference to FIG. 3 and FIG. 4. A description below will be made supposing that the system of managing the managing information in a file separate from an image data file, which system has been described with reference to FIG. 3 and FIG. 4, is used.

FIGS. 18A, 18B, and 18C are diagrams of assistance in explaining a case where the present invention is applied to a portable telephone terminal with a camera, and to a display mode of a result of classification displayed on the display screen G of the display element of the portable telephone terminal with the camera. FIG. 18A shows a first screen display displaying a result of classification, or a display of a list of dates into which image data is classified, that is, dates when an image was photographed by using a camera function or an image was obtained through an external device or a network and the image data was recorded on the recording medium of the portable telephone terminal with the camera.

Arrows displayed in an upper end part and a lower end part of the display screen G in FIG. 18A are icons indicating directions in which operation is possible when displayed dates (display range) are changed by a cross key or an arrow key of the portable telephone terminal with the camera. That is, a state shown in FIG. 18A indicates that there is also preceding and succeeding data.

When a cursor CS1 is positioned at a desired date display by operating the cross key or the arrow key of the portable telephone terminal with the camera, and a desired date is selected by operating an enter key, a list of title names of image data files obtained by photographing or obtained externally via a network or the like on the selected day and recorded on the recording medium of the portable telephone terminal with the camera is displayed on the display screen G of the portable telephone terminal with the camera, as shown in FIG. 18B.

In this case, the title names are displayed on the basis of text data recorded as title entries. Both image data files recorded after photographing and image data files obtained externally via a network or the like on a same day can be mixed with each other. However, these image data files can be clearly distinguished by original recorded file flags used at the time of classification. In this example, a mark MK as shown in FIG. 18B is attached to an image data file obtained externally through a network or the like and recorded on the recording medium so that the image data file can be distinguished.

When, as in selecting the date, a cursor CS2 is positioned at the file name of a desired image data file by operating the cross key or the arrow key of the portable telephone terminal with the camera, and the desired image data file is selected by operating the enter key, an image formed by the image data of the selected image data file is displayed in a size and a resolution according to the size of the display screen G on the display screen G of the portable telephone terminal with the camera, as shown in FIG. 18C. Thus, the desired image can be checked.

Thus, the portable telephone terminal with the camera classifies image data obtained by photographing by the own device using a photographing date as a classification key, and classifies image data obtained externally through a network or the like using a date of obtainment of the image data in the portable telephone terminal with the camera as a classification key.

Therefore, in either case, the classification can be performed using dates when image data was obtained and first recorded on the recording medium in the portable telephone terminal with the camera, which dates a user of the portable telephone terminal with the camera knows. Thus, an inconvenience of taking time to retrieve a desired image, for example because image data supplied externally is classified into unexpected dates, can be prevented.

In addition, even when it is difficult to display a result of classification together with calendar information because of the small size of the display screen of the display element, the result of classification can be displayed and provided with date information used as a classification key (used as a reference in a classification process) for reference. Thus, an inconvenience of taking time to retrieve a desired image, for example, can be prevented.

Thus, a display mode for informing a user of a result of classification is not limited to a mode of displaying the result of classification together with calendar information, and various display modes of at least displaying the result of classification with some date image information can be used.

Hence, an information processing device can be formed which classifies image data obtained by photographing using a photographing date and classifies image data supplied externally using a reception date, and which displays information indicating the photographing date or the reception date of the classified image data as a result of classification on a display element.

In addition, an information processing device can be formed which has specifying means for specifying desired information from information indicating photographing dates or reception dates displayed as a result of classification, wherein image-related information related to image data classified into a date identified by the information specified by the specifying means is displayed such that the image-related information on the image data classified according to the photographing date is distinguished from the image-related information on the image data classified according to the reception date.

In addition, an information processing device can be formed which has second specifying means for specifying image-related information related to desired image data, wherein an image based on the image data corresponding to the image-related information specified by the second specifying means is displayed in a resolution corresponding to a display area of the display element.

Incidentally, the portable telephone terminal with the camera includes, in addition to the configuration of the digital camera shown in FIG. 1, a transmitting and receiving antenna, an antenna duplexer, a receiving circuit for demodulating and decoding a received signal, a telephone receiver (speaker) connected to the receiving circuit, a telephone transmitter (microphone), and a transmitting circuit for forming a transmitting signal by encoding and modulating an audio signal from the telephone transmitter.

Of course, the portable telephone terminal with the camera can also receive image data and text data through a receiving system including the receiving circuit and record the image data and the text data on the recording medium, and transmit text data input through an operating unit or image data recorded on the recording medium to a desired destination through a transmitting system including the transmitting circuit.

That is, the portable telephone terminal is externally supplied with various data such as image data and the like through the receiving system of the own device, and records the data on the recording medium of the own device so that the data can be used. The portable telephone terminal can classify the thus captured data and data created by the own device using the same criterion.

It is to be noted that while the foregoing embodiment has been described assuming that image data obtained externally is always classified according to a date and time of obtainment of the image data in the own device, the present invention is not limited to this. For example, there are cases where a user receives photographs of a wedding that the user attended by electronic mail and the user is given image data of photographs of a trip that the user participated in from a friend.

In such cases, a search can be easier when dates of actual photographing are used than when dates of obtainment in the electronic device such as the digital camera used by the user are used. Accordingly, for image data obtained externally, switching is allowed to be performed between the use of obtainment dates and times and the use of photographing dates and times in a classification process, so that image data supplied externally can also be classified according to a photographing date and time, that is, a date and time of actual creation of the image data.

Further, while the foregoing embodiment has been described supposing that correction date and time information is used as obtainment date and time information, the present invention is not limited to this. Of course, obtainment date and time information may be provided separately from correction date and time information. This also makes it possible to classify both image data obtained by photographing by the own device and image data supplied externally using obtainment date and time information.

Further, while in the foregoing embodiment, description has been made of a case where the scroll speed is controlled to be decreased at a part having a week into which a large number of images are classified, the present invention is not limited to this. For example, there is a case where scrolling is desired to be performed quickly to a week including a desired date. In such a case, control can be performed such that quicker scrolling is performed at a part having a week into which a large number of images are classified. Thus, several scroll modes may be provided so that the user changes to a desired scroll mode.

It is to be noted that as described above, the present invention is applicable to cases where not only image data but also various other digital data is processed. When data other than image data is processed, a creation date and time on which the data was first created is substituted for a photographing date and time.

Further, while a result of classification is displayed in units of a date in the foregoing embodiment, the result of classification may of course be displayed and provided in units of a predetermined period of time, such as units of a week, units of a month, units of two days, units of three days, or the like.

Further, the system of managing managing information for data subjected to a classification process such as image data or the like is not limited to the above-described examples, and various systems and modes can be used, including, for example, a system or a mode in which each piece of managing information is managed in a separate file.

As described above, according to the present invention, when data created (generated) by an own device and data obtained externally are recorded on a recording medium in a state of being mixed with each other, and classification is performed using the date of the creation, it is possible to prevent the externally obtained data from being classified into an unexpected date and time.

In addition, by displaying a result of classification in association with dates of date image information such as calendar information or the like, the result of classification can be displayed and provided to the user in such a manner as to be easily perceived visually.

Further, the collective management of managing information for data such as recorded image data or the like enables a quick search based on creation date and time information of the data.

Further, when a result of classification is displayed together with date image information, a period into which no images are classified is skipped, and thereby the result of classification can be checked quickly. Further, by changing scroll speed according to, for example, an amount of data classified into corresponding dates of date image information, a result of classification can be displayed without an advantage of the date image information (an advantage of being able to display the result of classification on a visually familiar screen) being impaired.

The invention claimed is:

1. A digital camera, comprising:
    determining means for determining whether an image file stored on the camera was captured by the camera or was obtained from a source external to the camera;
    classifying means for classifying the image file according to information concerning the date of capture of the image file in the case that the determining means determines that the image file was captured by the camera, and for classifying the image file according to information concerning the date the image file was obtained in the case that the determining means determines that the image file was obtained from a source external to the camera; and
    display control means for controlling a display unit to display a result of classification performed by the classifying means,
    whereby an image file obtained from a source external to the camera is classified according to the date the image file was obtained, even though the camera receives an indication of when the image file was captured,
    the camera defines, for each image file stored in the camera, an original recorded file flag, a photographing date and time, and a correction date and time, the original recorded file flag indicating whether the image file was captured by the camera or was obtained from a source external to the camera, the photographing date and time being used to indicate a photographing date and time for the image file in the case that the image file is an image file captured by the camera, and the correction date and time being used to indicate a date and time of correction for the image file in the case that the image file is captured by the camera and corrected, and being used to indicate a date and time of obtainment for the image file in the case that the image file is obtained from a source external to the camera,
    the display control means displays a result of classification with a distinction between image files captured by the camera and image files obtained from a source external to the camera.

2. The digital camera as claimed in claim 1, wherein
    the display control means divides a predetermined display screen of the display unit into a plurality of areas, assigns a date to each of the areas, and displays, as the result of the classification, the presence of an image file in the area having a date corresponding to the information on the date of capture of the image file or the information on the date of obtainment of the image file.

3. The digital camera as claimed in claim 1, wherein
    the display control means displays the information on the date of capture of the image file or the information on the date of obtainment of the image file on a predetermined display screen of the display unit.

4. The digital camera as claimed in claim 2 or claim 3, farther comprising instructing means for giving an instruction to display a list of image files classified as the result of the classification on the predetermined display screen of the display unit,
    wherein according to the instruction given by the instructing means, the display control means displays the image files classified by the classifying means on the display screen such that the image file classified according to the information on the date of capture is distinguished from the image file classified according to the information on the date of obtainment.

5. The digital camera as claimed in claim 2 or claim 3, wherein
    the display control means scrolls the predetermined display screen of the display unit to display the result of the classification.

6. The digital camera as claimed in claim 5, wherein
    the display control means changes a speed at which the predetermined display screen of the display unit is scrolled according to a quantity of image files classified as the result of the classification.

7. The digital camera as claimed in claim 6, wherein
    when changing the speed at which the predetermined display screen of the display unit is scrolled, the display control means considers a scroll amount required to display the result of the classification to be displayed by scrolling at a predetermined position on the display screen.

8. An image file processing method, comprising the steps of:
    determining whether an image file stored on a camera was captured by the camera or was obtained from a source external to the camera;
    classifying the image file according to information concerning the date of capture of the image file in the case that it is determined that the image file was captured by the camera, and for classifying the image file according to information concerning the date the image file was obtained in the case that it is determined that the image file was obtained from a source external to the camera; and
    displaying on a display unit a result of the step of classifying,
    whereby an image file obtained from a source external to the camera is classified according to the date the image file was obtained, even though the camera receives an indication of when the image file was captured,
    the camera defines, for each image file stored in the camera, an original recorded file flag, a photographing date and time, and a correction dated and time, the original recorded file flag indicating whether the image file was captured by the camera or was obtained from a source external to the camera, the photographing date and time being used to indicate a photographing date and time for the image file in the case that the image file is an image file captured by the camera, and the correction date and time being used to indicate a date and time of correction for the image file in the case that the image file is captured by the camera and corrected, and being used to indicate a date and time of obtainment for the image file in the case that the image file is obtained from a source external to the camera, the step of displaying includes displaying a result of classification with a distinction between image files captured by the camera and image files obtained from a source external to the camera.

9. The image file processing method as claimed in claim 8, wherein the displaying step includes dividing a predetermined display screen of the display unit into a plurality of areas, assigning a date to each of the areas, and displaying, as the result of the classification, the presence of an image file in the area having a date corresponding to the information on the date of capture of the image file or the information on the date of obtainment of the image file.

10. The image file processing method as claimed in claim 8, wherein the displaying step includes displaying the information on the date of capture of the image file or the information on the date of obtainment of the image file on a predetermined display screen of the display unit.

11. The image file processing method as claimed in claim 9 or claim 10, further comprising giving an instruction to display a list of image files classified as the result of the classification on the predetermined display screen of the display unit, wherein the displaying step includes, according to the instruction given in the instruction giving step, displaying the image files classified in the classifying step on the display screen such that the image file classified according to the information on the date of capture is distinguished from the image file classified according to the information on the date of obtainment.

12. The image file processing method as claimed in claim 9 or claim 10, wherein the displaying step includes scrolling the predetermined display screen of the display unit to display the result of the classification.

13. The image file processing method as claimed in claim 12, wherein the displaying step includes changing a speed at which the predetermined display screen of the display unit is scrolled according to a quantity of image files classified as the result of the classification.

14. The image file processing method as claimed in claim 13, wherein the displaying step includes, when changing the speed at which the predetermined display screen of the display unit is scrolled, considering a scroll amount required to display the result of the classification to be displayed by scrolling at a predetermined position on the display screen.

* * * * *